United States Patent
Horii et al.

(10) Patent No.: US 9,670,004 B1
(45) Date of Patent: Jun. 6, 2017

(54) ARTICLE TRANSPORT FACILITY

(71) Applicant: Daifuku Co., Ltd., Osaka-shi (JP)

(72) Inventors: Takahiro Horii, Hinocho (JP); Motohiro Fujita, Hinocho (JP)

(73) Assignee: Daifuku Co., Ltd., Osaka-shi (JP)

( * ) Notice: Subject to any disclaimer, the term of this patent is extended or adjusted under 35 U.S.C. 154(b) by 0 days.

(21) Appl. No.: 15/373,042

(22) Filed: Dec. 8, 2016

(30) Foreign Application Priority Data

Dec. 9, 2015 (JP) ................................ 2015-240458

(51) Int. Cl.
*G06F 7/00* (2006.01)
*B65G 43/00* (2006.01)
*G05B 19/418* (2006.01)

(52) U.S. Cl.
CPC ......... *B65G 43/00* (2013.01); *G05B 19/4189* (2013.01)

(58) Field of Classification Search
None
See application file for complete search history.

(56) References Cited

U.S. PATENT DOCUMENTS

2016/0297610 A1* 10/2016 Grosse ..................... B60M 1/34
2016/0347551 A1* 12/2016 Nishikawa ............. B65G 37/02
2017/0062251 A1* 3/2017 Ayabe ............... H01L 21/67265

FOREIGN PATENT DOCUMENTS

JP          2005170544        6/2005

* cited by examiner

*Primary Examiner* — Yolanda Cumbess
(74) *Attorney, Agent, or Firm* — The Webb Law Firm

(57) ABSTRACT

An article transport facility is provided with a first control device that controls an article transport vehicle in a first area in which articles are transported, and a second control device that controls the article transport vehicle in a second area in which adjustment of the article transport vehicle is performed. Based on a withdrawal instruction from the first control device, an operation control portion of an article transport vehicle that needs adjustment causes the article transport vehicle to enter the second area, and a communication control portion that can perform exclusive wireless communication with the first control device and the second control device changes the communication destination to the second control device. In response to an adjustment instruction from the second control device, the operation control portion performs adjustment operations with use of the adjustment device and updates transport profile information in a profile storage portion, and then the communication control portion changes the communication destination to the first control device after updating is complete.

7 Claims, 11 Drawing Sheets

ARTICLE TRANSPORT FACILITY

CROSS-REFERENCE TO RELATED APPLICATION

This application claims priority to Japanese Patent Application No. 2015-240458 filed Dec. 9, 2015, the disclosure of which is hereby incorporated in its entirety by reference.

FIELD OF THE INVENTION

The present invention relates to an article transport facility that includes multiple loading platforms provided on the ground side, and an article transport vehicle that travels while being suspended from a traveling rail disposed on a ceiling and that transports articles from a loading platform that is the transport source to a loading platform that is the transport destination.

BACKGROUND

There are article transport facilities in practical use that automatically transport articles with use of an article transport vehicle that is suspended from a rail provided on a ceiling. In order to transfer articles with high precision, or more specifically in order to precisely hold articles at the transport source, transport them, and precisely place them at a predetermined position at the transport destination, it is preferable to precisely adjust the stop position of the article transport vehicle and the position at which a supporting portion for supporting an article performs a support operation. JP 2005-170544A (Patent Document 1) discloses technology for correcting such stop positions and operation positions.

The technology in Patent Document 1 makes use of a position corrector that has the same shape as the transport target article and is internally provided with a camera and an image processing device, and a correction sheet that is placed on the loading platform on which the article is to be placed. An article transport vehicle that holds the position corrector moves the position corrector relative to the loading platform on which the correction sheet is placed, and an image of the correction sheet is captured by the camera provided in the position corrector. The imaging result is processed by the image processing device and provided to the article transport vehicle. The article transport vehicle stores image information that is to serve as a reference, compares the correction sheet imaging information provided by the position corrector with the reference image information, and detects the difference between them as a position offset amount. The detected position offset amount is stored as correction data. When subsequent transport is to be performed, the stop position is corrected using the correction data, thus making it possible to precisely transport and transfer articles (e.g., see paragraphs [0022] to [0045] of Patent Document 1).

Patent Document 1 discloses that an operator lowers the position corrector and fixes it at a normal position on a reference frame, and it is necessary for the operator to be involved in the adjustment operation (e.g., see [0039]). In general, manual adjustment operations tend to require a longer lead time. The operation rate of the article transport facility decreases because articles cannot be transported by the article transport vehicle that is the adjustment target during adjustment. Also, if adjustment is simply automated, the article transport vehicle that is the adjustment target also needs to be controlled by the system controller that performs overall system control in Patent Document 1 (e.g., see paragraph [0027] and FIG. 4 of Patent Document 1) for example, and there is also a risk of leading to a decrease in the operation rate due to an increase in the load on the system controller.

SUMMARY OF THE INVENTION

In light of the above-described circumstances, there is desire for the provision of technology that makes it possible to efficiently perform article transport vehicle adjustment while also suppressing a decrease in the overall operation rate of the article transport facility.

In light of the above, an article transport facility according to one aspect includes: a traveling rail disposed on a ceiling;

a plurality of loading platforms provided on a ground side along the traveling rail;

an article transport vehicle that is suspended from the traveling rail, travels along a traveling path formed by the traveling rail, and transports an article from a loading platform that is a transport source to a loading platform that is a transport destination;

a first area in which the article is transported by the article transport vehicle;

a second area that is provided in a region different from the first area, and in which adjustment of the article transport vehicle is performed;

an adjustment device disposed in the second area;

a first control device that controls operations of the article transport vehicle in the first area; and a second control device that controls operations of the article transport vehicle in the second area, wherein the traveling path includes a first path provided in the first area, and a second path that is provided in the second area and diverges from and merges with the first path, the article transport vehicle is provided with a communication control portion that can perform exclusive wireless communication with at least the first control device and the second control device, an operation control portion that causes the article transport vehicle to operate under autonomous control based on instructions from the first control device and the second control device, and a profile storage portion that stores transport profile information that includes at least position information for transferring the article at the loading platforms, the first control device gives the article transport vehicle an operation instruction for causing the article transport vehicle to operate, the operation instruction includes at least an article transport instruction for transporting the article, and a withdrawal instruction for causing the article transport vehicle to withdraw from the first area to the second area, the operation control portion of an adjustment target vehicle, which is the article transport vehicle that needs adjustment, causes the article transport vehicle to enter the second path based on the withdrawal instruction, and the communication control portion of the adjustment target vehicle changes a communication destination from the first control device to the second control device, in response to an adjustment instruction from the second control device, the operation control portion of the adjustment target vehicle performs adjustment with use of the adjustment device and updates the transport profile information, and the communication control portion of the adjustment target vehicle changes the communication destination from the second control device to the first control device after the transport profile information has been updated.

According to this configuration, the article transport facility region is divided into the first area in which articles are transported and the second area in which article transport vehicle adjustment is performed, and the first control device and the second control device that control the article transport vehicle are independently provided in the respective areas. Accordingly, article transport vehicle adjustment can be performed independently and efficiently, and without influencing article transport. Also, wireless communication is performed between the first control device and the article transport vehicle and between the second control device and the article transport vehicle, and therefore operations of the article transport vehicle can be controlled in the two areas without giving consideration to the connection of communication wiring or the like. Also, the article transport vehicle performs exclusive wireless communication with the first control device and the second control device, and therefore communication interference is suppressed without using multiple communication means or communication channels.

Also, after receiving the withdrawal instruction, the communication destination of the adjustment target vehicle is switched from the first control device to the second control device, and therefore article transport in the first area is never hindered. Note that the communication control portion may switch the communication destination based on only the withdrawal instruction, or may switch the communication destination after the operation control portion causes the adjustment target vehicle to enter the second path. In the latter case, an article transport vehicle that is no longer controlled by the first control device never remains in the first area. Accordingly, the hindrance of article transport in the first area is suppressed even more reliably. In the second area, the adjustment target vehicle performs adjustment operations in accordance with an adjustment instruction from the second control device, and updates the transport profile information. An operator is not involved in the adjustment operation, thus shortening the adjustment lead time and also reducing the need for operator effort. After adjustment is complete, the communication destination of the adjustment target vehicle is changed from the second control device to the first control device, and then the adjustment target vehicle is controlled by the first control device as a normal article transport vehicle, swiftly returns to the first area, and can transport articles. In this way, according to the above configuration, it is possible to efficiently perform article transport vehicle adjustment while also suppressing a decrease in the overall operation rate of the article transport facility.

Further features and advantages of the article transport facility will become apparent from the following description of embodiments with reference to the drawings.

DETAILED DESCRIPTION

Figure 1:
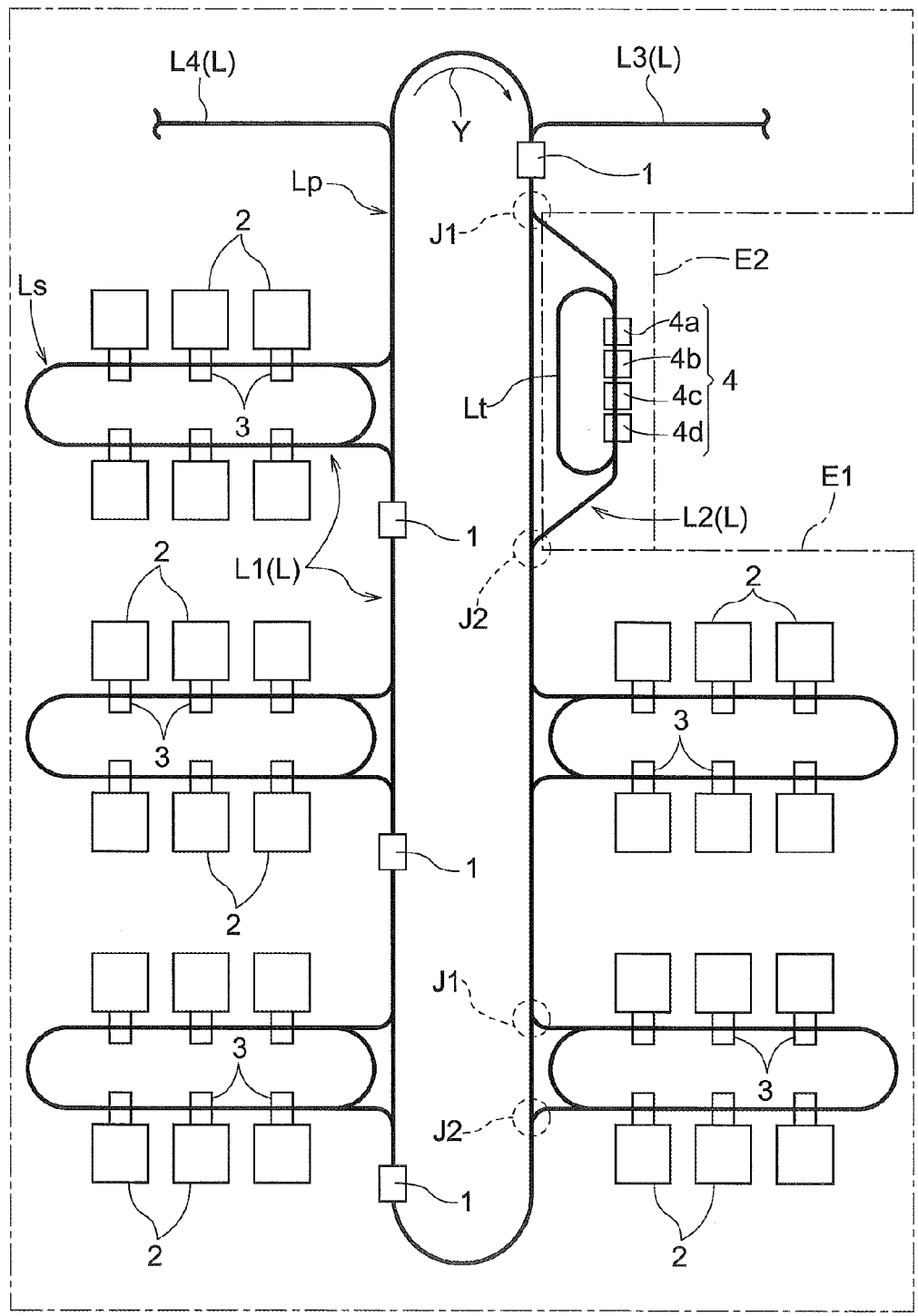
FIG. 1 is a diagram schematically showing a configuration of an article transport facility.
Figure 2:
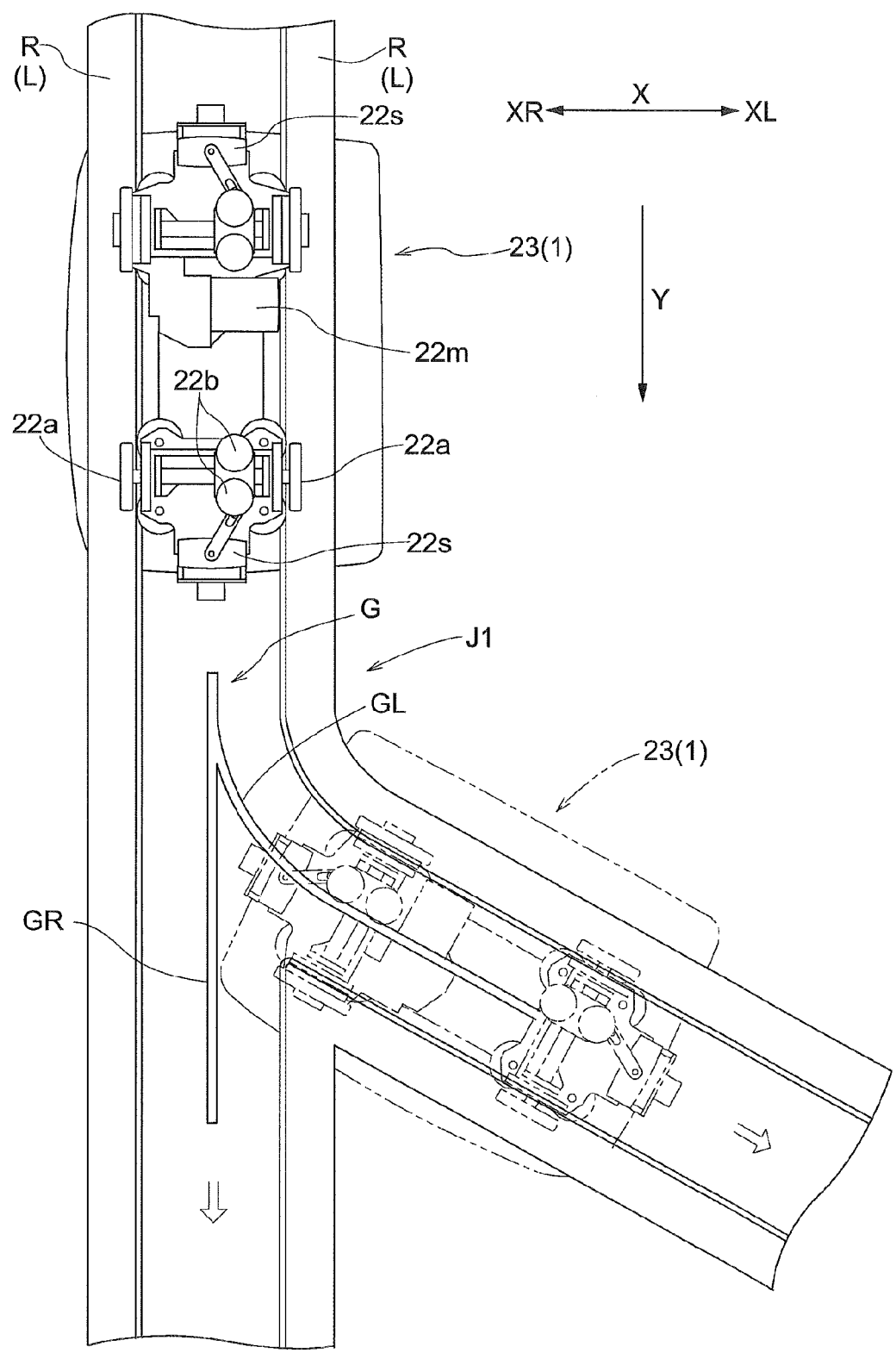
FIG. 2 is an enlarged view of a diverging part.
Figure 3:
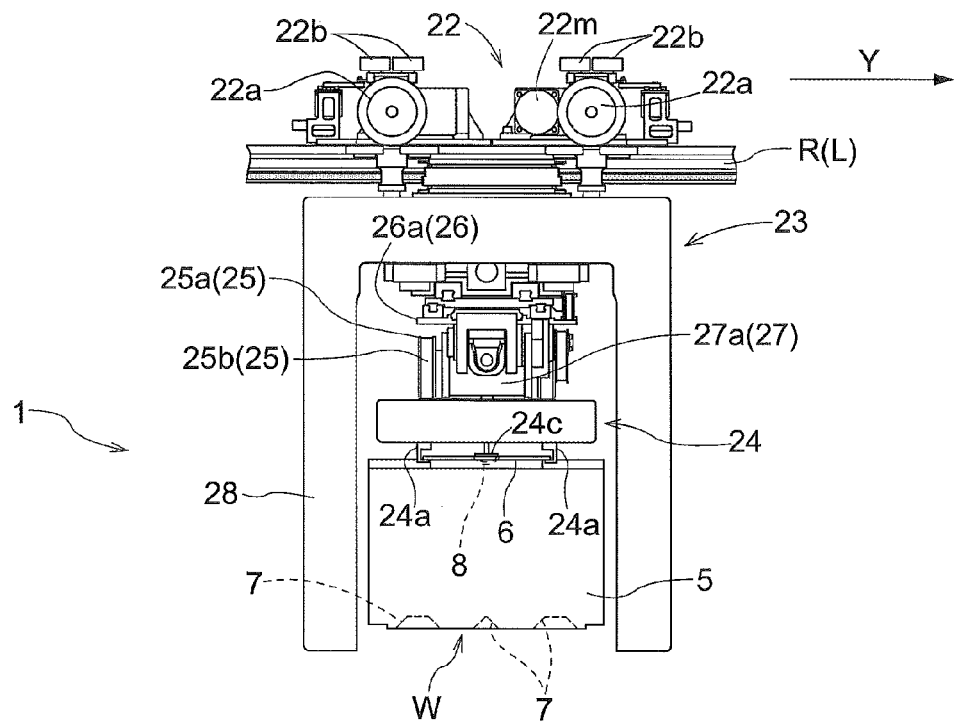
FIG. 3 is a side view of a ceiling transport vehicle.

An embodiment of an article transport facility will be described below with reference to the drawings. As shown in FIG. 1, the description in the present embodiment will be given by way of example of an article transport facility that transports articles along a traveling path L between semiconductor processing devices (referred to hereinafter as processing devices 2) that subject semiconductor substrates to various types of processing such as thin film formation, photolithography, and etching. As shown in FIG. 1, the traveling path L is not formed by a single continuous path, but rather is formed by multiple paths that are connected in parallel. The traveling path L therefore has diverging portions J1 where the path diverges, and merging portions J2 where paths merge. FIG. 2 is an enlarged view of a diverging portion J1 where the traveling path L diverges. The traveling path L is formed by a traveling rail R (see FIGS. 2 and 3) disposed on a ceiling. In the present embodiment, a ceiling transport vehicle 1 that is suspended from the traveling rail R as shown in FIG. 3 will be described as an example of an article transport vehicle. FIG. 3 is a side view of the ceiling transport vehicle 1 (view in the direction orthogonal to a traveling direction Y). In the following description, the direction in which the ceiling transport vehicle 1 travels will be referred to as the traveling direction Y, and the direction that is orthogonal to the traveling direction Y in a plan view (the direction orthogonal to the traveling direction Y on the horizontal plane) will be referred to as a lateral direction X.

In the present embodiment, a container W that is called an FOUP (Front Opening Unified Pod) and accommodates a semiconductor substrate is described as an example of the article transported by the ceiling transport vehicle 1 (see FIG. 3). The processing devices 2 subjects the substrate (semiconductor substrate) accommodated in the container W to various types of processing such as those described above. In order to transport the container W between processing devices 2, the processing devices 2 are each provided with a support platform 3 (loading platform) on the floor at a location adjacent to the processing device 2. These support platforms 3 are transport target locations (transport sources and transport destinations) to/from which the container W is transported by the ceiling transport vehicle 1.

Specifically, the article transport facility includes the traveling rail R that is disposed on the ceiling, multiple support platform 3 that are provided on the ground side along the traveling rail R (traveling path L), and the ceiling transport vehicle 1. The ceiling transport vehicle 1 is suspended from the traveling rail R, travels along the traveling path L formed by the traveling rail R, and transports the container W from one support platform 3 that is the transport source to another support platform 3 that is the transport destination. During normal operations, the ceiling transport vehicle 1 travels along the traveling path L (later-described first path L1) and transports an article (container W) from one support platform 3 that is the transport source to another support platform 3 that is the transport destination. Note that during a later-described adjustment operation, the ceiling transport vehicle 1 travels along the traveling path L (later-described second path L2) and transports an article (later-described adjustment unit C; see FIG. 9 etc.) from one inspection platform 4 (adjustment loading platform) that is the transport source to another inspection platform 4 that is the transport destination. Note that the inspection platforms 4 and the adjustment unit C are configured such that the adjustment unit C can be placed on an inspection platform 4 in the same manner as the manner in which a container W is placed on a support platform 3.

As shown in FIG. 1, at least two regions with different attributes (a first area E1 and a second area E2) are provided in the article transport facility. The traveling path L includes a first path L1 that is provided in the first area E1, and a second path L2 that is provided in the second area E2 and also diverges from and merges with the first path L1. The first area E1 is the region in which the above-described processing devices 2 are provided and in which the container W is transported between processing devices 2 (support platforms 3) by the ceiling transport vehicle 1. The second area E2 is provided in a separate region from the first area E1, and is the region in which adjustment of the ceiling transport vehicle 1 is performed using the later-described adjustment unit C. Inspection platforms 4 (adjustment loading platforms), which serve as inspection target locations where a later-described detection target object M (see FIG. 9) is provided, are disposed on the floor in the second area E2. The present embodiment describes the example of an aspect in which four inspection platforms 4 are disposed in the second area E2 (see FIGS. 1 and 8).

The first path L1 includes a main path Lp that is shaped as a relatively large ring and is shown in the central portion in FIG. 1, and sub paths Ls that are shaped as relatively small rings and are shown on the outer side of the main path Lp. As shown in FIG. 2, a guide rail G is provided at the diverging portion J1 where a sub path Ls diverges from the main path Lp. A diverging portion J1 is also provided at the portion where the second path L2 diverges from the first path L1, and a guide rail G is similarly provided there as well. Also, although not shown or described in detail, a guide rail G is similarly provided at the merging portion J2 where the sub path Ls merges with the main path Lp as well. The same follows for the other diverging portions and merging portions (e.g., the diverging portion and the merging portion between the main path Lp and external connection paths (entrance path L3 and exit path L4) that are connected to the main path Lp in the top portion of FIG. 1).

As shown in FIG. 3, the ceiling transport vehicle 1 includes a traveling portion 22 that travels along the traveling path L, and a container supporting portion 23 that is suspended from the traveling portion 22 so as to be positioned below the traveling rail R. The container supporting portion 23 includes a support mechanism 24 that supports the container W. The traveling portion 22 includes traveling wheels 22a that roll over the traveling rail R disposed along the traveling path L, and a travel motor 22m that rotates the traveling wheels 22a. The traveling portion 22 travels along the traveling path L due to the traveling wheels 22a being rotated by the driving of the travel motor 22m.

As shown in FIGS. 2 and 3, the traveling portion 22 also includes guide rollers 22b that are guided by the guide rails G provided in the diverging portions J1 and the merging portions J2 of the traveling path L. The guide rollers 22b are configured to be able to change in orientation in the left-right direction (lateral direction X) in a view along the traveling direction Y of the traveling portion 22. The change in orientation of the guide rollers 22b is performed by a guide roller solenoid 22s (see FIGS. 2 and 4). The guide roller solenoid 22s switches the position of the guide rollers 22b between a first position on the right side (rightward direction XR side) in the traveling direction Y and a second position on the left side (leftward direction XL side), and also holds the guide rollers 22b at the switched position. When located at the first position, the guide rollers 22b abut against the right side surface of the guide rail G in a view along the traveling direction Y, and guide the traveling portion 22 along the portion of the guide rail on the non-diverging side (the guide rail that extends relatively on the right side in the traveling direction Y (straight-side guide rail GR)). Also, when located at the second position, the guide rollers 22b abut against the left side of the guide rail G in a view along the traveling direction Y, and guide the traveling portion 22 along the portion of the guide rail that extends on the left side (diverging-side guide rail GL).

As shown in FIG. 3, the container W has a flange portion 6 and an accommodating portion 5. The flange portion 6 is provided on the upper end portion of the container W, and is the portion that is supported by the support mechanism 24 of the ceiling transport vehicle 1. The accommodating portion 5 is located below the flange portion 6 and accommodates multiple semiconductor substrates. Note that a substrate entrance for the entrance and exit of substrates is formed in the front surface of the accommodating portion 5. The container W includes a removable lid member (not shown) that can close the substrate entrance. The ceiling transport vehicle 1 transports the container W in the state where the flange portion 6 is suspended by the support mechanism 24.

As shown in FIG. 3, the bottom surface of the accommodating portion 5 (the bottom surface of the container W) is provided with three groove-shaped bottom recessed portions 7 that are recessed upward. These three bottom recessed portions 7 are formed such that their lengthwise directions extends radially outward from a bottom reference position as the center. Also, the three bottom recessed portions 7 are each formed so as to be tapered upward, and the inner side surfaces of the bottom recessed portions 7 are formed so as to be inclined surfaces. The functions of these bottom recessed portions 7 will be described later. Also, as shown in FIG. 3, the upper surface of the flange portion 6 (the upper surface of the container W) is provided with a top recessed portion 8 that is recessed downward with a conical shape. The top recessed portion 8 is formed so as to be tapered downward, and the inner side surface of the top recessed portion 8 is formed so as to be an inclined surface. The functions of the top recessed portion 8 will also be described later.

The container supporting portion 23 of the ceiling transport vehicle 1 includes the support mechanism 24 (supporting portion), an elevation driving portion 25, a slide driving portion 26, a rotation driving portion 27, and a cover member 28. The support mechanism 24 is a mechanism for suspending the container W. The elevation driving portion 25 is a driving portion for raising and lowering the support mechanism 24 relative to the traveling portion 22. The slide driving portion 26 is a drive portion for sliding the support mechanism 24 in the lateral direction X relative to the traveling portion 22. The rotation driving portion 27 is a driving portion for rotating the support mechanism 24 about a longitudinal axis (vertical axis; not shown) relative to the traveling portion 22. As shown in FIG. 3, the cover member 28 is a member for covering the upper side and front and rear sides, in the path direction, of the container W when the support mechanism 24 supporting the container W has risen to a later-described raising set position. Note that the raising set position is a position that has been defined in advance as the up-down position (vertical position) at which the support mechanism 24 is to be located when the ceiling transport vehicle 1 travels along the traveling rail R while supporting an article such as the container W.

Figure 4:
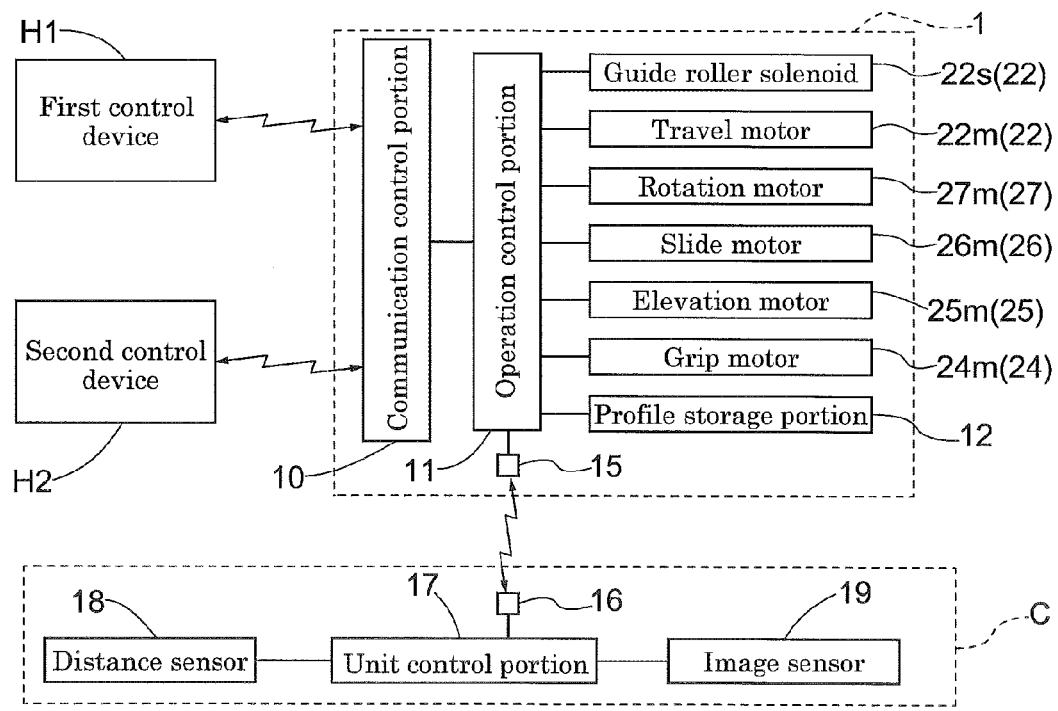
FIG. 4 is a block diagram schematically showing a system configuration of the article transport facility and the ceiling transport vehicle.

FIG. 4 is a block diagram schematically showing the system configuration of the article transport facility and the ceiling transport vehicle 1. A first control device H1 is a system controller that serves as the core of the article transport facility. The first control device H1 is a host controller for the ceiling transport vehicle 1, and is the control device that serves as the core in transport control for transporting the container W by mainly controlling the operations of the ceiling transport vehicle 1 in the first area E1. A second control device H2 is the host controller that serves as the core in adjustment control for performing adjustment control on the ceiling transport vehicle 1, and is the control device that controls operations of the ceiling transport vehicle 1 in the second area E2. The ceiling transport vehicle 1 performs exclusive wireless communication with the first control device H1 and the second control device H2, and holds and transports an article (the container W or the adjustment unit C) by operating under autonomous control based on instructions from either one of the control devices.

As shown in FIG. 4, the ceiling transport vehicle 1 includes a communication control portion 10, an operation control portion 11, a profile storage portion 12, and an adjustment communication portion 15. The communication control portion 10 is constituted by an antenna, a communication control circuit, and the like that support wireless LAN communication or the like, and performs exclusive wireless communication with at least the first control device H1 and the second control device H2. The operation control portion 11 is constituted by a microcomputer or the like, and causes the ceiling transport vehicle 1 to operate under autonomous control based on instructions from the first control device H1 and the second control device H2.

The profile storage portion 12 is constituted by a storage medium such as a memory, and stores transport profile information that includes at least position information for transferring the container W at the support platforms 3. The position information includes transport stop target position information and transport move target position information for transporting and transferring the container W at the support platforms 3. Although described later in more detail, the transport stop target position information is information indicating a target position (transport stop target position) at which the traveling portion 22 is to be stopped on the traveling rail R (traveling path L, or more specifically the first path L1). Also, the transport move target position information is information indicating a target position (transport move target position) at which the support mechanism 24 is to be moved (raised/lowered, rotated, or slid; described in more detail later) relative to the traveling portion 22 while stopped on the traveling rail R (traveling path L, or more specifically the first path L1).

The adjustment communication portion 15 is constituted by an antenna and a communication control circuit that support a short-range wireless communication standard, for example. Although described in more detail later, the adjustment communication portion 15 performs wireless communication with a unit communication portion 16 of the adjustment unit C and receives updated transport profile information or profile information for updating (e.g., difference information).

The support mechanism 24 included in the container supporting portion 23 is provided with a pair of gripping claws 24a (see FIG. 3) and a grip motor 24m (see FIG. 4). As shown in FIG. 3, the gripping claws 24a are each L-shaped in a view from the side (in a view in the X direction) such that the flange portion 6 is supported from below by the lower end portions of the gripping claws 24a. The pair of gripping claws 24a are configured to move toward and away from each other in the horizontal direction. The pair of gripping claws 24a move toward and away from each other by driving force from the grip motor 24m. A separate grip motor 24m may be provided for each of the gripping claws 24a, and, in the case where a coordination mechanism for moving the pair of gripping claws 24a in coordination is provided, a single grip motor 24m that drives the coordination mechanism may be provided.

It is assumed hereinafter that the pair of gripping claws 24a are moved in coordination by a single grip motor 24m. For example, the grip motor 24m can cause the pair of gripping claws 24a to move toward each other such that the flange portion 6 of the container W is supported by the pair of gripping claw 24a. Alternatively, a structure is possible in which the gripping claws 24a are supported by a common support shaft (not shown), and the grip motor 24m causes the tip portions of the pair of gripping claws 24a to swing and approach each other so as to support the flange portion 6. At this time, the support mechanism 24 enters a support state. Also, the grip motor 24m can cause the pair of gripping claws 24a to move away from each other such that the flange portion 6 of the container W is no longer supported by the pair of gripping claws 24a. At this time, the support mechanism 24 enters a support canceled state. In other words, the support mechanism 24 is configured to be able to switch between the support state and the support canceled state.

As shown in FIG. 3, the support mechanism 24 that suspends the container W is supported so as to be capable of being raised and lowered relative to the traveling portion 22 by the elevation driving portion 25 included in the container supporting portion 23 likewise to the support mechanism 24. The elevation driving portion 25 includes a winding member 25a, a take-up belt 25b, and an elevation motor 25m (see FIG. 4). The winding member 25a is supported by a later-described rotating portion 27a. The take-up belt 25b is wound around the winding member 25a, and the support mechanism 24 is coupled to and supported by the leading end portion of the take-up belt 25b. The elevation motor 25m applies motive force for rotating the winding member 25a. The elevation driving portion 25 takes up or feeds out the take-up belt 25b by causing the elevation motor 25m to rotate the winding member 25a in a forward direction or a reverse direction. The support mechanism 24 and the container W supported by the support mechanism 24 are thus raised and lowered. Note that the elevation driving portion 25 also has an encoder (not shown) that measures the feed amount of the winding member 25a in units of pulses. The operation control portion 11 controls the elevation height of the support mechanism 24 based on the number of pulses.

The slide driving portion 26 that is likewise included in the container supporting portion 23 is provided with a relay portion 26a (see FIG. 3) and a slide motor 26m (see FIG. 4). The relay portion 26a is supported by the traveling portion 22 so as to be capable of sliding in the lateral direction X relative to the traveling portion 22. The slide motor 26m applies motive force for sliding the relay portion 26a in the lateral direction X. The slide driving portion 26 moves the support mechanism 24 and the elevation driving portion 25 in the lateral direction X by causing the slide motor 26m to perform driving for sliding the relay portion 26a in the lateral direction X.

The rotation driving portion 27 that is likewise included in the container supporting portion 23 is provided with a rotating portion 27a (see FIG. 3) and a rotation motor 27m (see FIG. 4). The rotating portion 27a is rotatably supported by the relay portion 26a so as to be capable of rotating about a longitudinal axis. The rotation motor 27m applies motive force for rotating the rotating portion 27a about the longitudinal axis. The rotation driving portion 27 rotates the support mechanism 24 and the elevation driving portion 25 about the longitudinal axis by causing the rotation motor 27m to perform driving for rotating the rotating portion 27a.

As described above, the profile storage portion 12 stores position information (transport stop target position information and transport move target position information) for transferring an article (container W) at each of the loading platforms (support platforms 3). The transport stop target position is a target position at which the ceiling transport vehicle 1 (traveling portion 22) is to be stopped on the traveling rail R (traveling path L) when the ceiling transport vehicle 1 transfers the container W to or from each of the support platforms 3 (i.e., receives or delivers the container W). The transport stop target position information is information indicating this transport stop target position. The transport move target position is a target position to which the support mechanism 24 is to be moved (raised/lowered, rotated, slid) relative to the traveling portion 22 when the ceiling transport vehicle 1 is stopped at the transport stop target position and is to transfer the container W between the container supporting portion 23 and the support platform 3 (i.e., receive or deliver the container W). The transport move target position information is information indicating this transport move target position.

For example, the transport move target position is defined by a rotation set position that defines a rotational position about the longitudinal axis for the support mechanism 24 relative to the traveling portion 22, a lateral set position that defines the position of the support mechanism 24 in the lateral direction X relative to the traveling portion 22, and a lowering set position that defines the position of the support mechanism 24 in the up-down position relative to the traveling portion 22. In this case, it is preferable that the rotation reference position is the position of the support mechanism 24 about the longitudinal axis when the traveling portion 22 is traveling along the traveling rail R, the lateral reference position is the position of the support mechanism 24 in the lateral direction X when the traveling portion 22 is traveling, and the raising set position is the position of the support mechanism 24 in the up-down position when the traveling portion 22 is traveling. In other words, the position of the support mechanism 24 when it is located at the rotation reference position about the longitudinal axis, at the lateral reference position in the lateral direction X, and at the raising set position in the up-down position, is the traveling position of the support mechanism 24. The ceiling transport vehicle 1 travels along the traveling rail R in the state where the support mechanism 24 is located at the traveling position.

As described above with reference to FIG. 1, at least two regions with different attributes (the first area E1 and the second area E2) are provided in the article transport facility. In the first area E1, the ceiling transport vehicle 1 transports the container W between support platforms 3. The second area E2 is the region in which adjustment of the ceiling transport vehicle 1 is performed, and the inspection platforms 4 (adjustment loading platforms) that serve as inspection target locations are disposed on the floor. In addition to the transport stop target position information and the transport move target position information for transporting and transferring the container W at the support platforms 3, the position information stored in the profile storage portion 12 further includes adjustment stop target position information and adjustment move target position information that will be described later. In other words, the position information also includes adjustment stop target position information and adjustment move target position information for transporting and transferring the adjustment unit C that serves as the article relative to an inspection platform 4 (or each of inspection platforms 4 when there are more than one). In other words, the profile storage portion 12 stores transport profile information that includes at least position information for transferring articles (container W and adjustment unit C) at loading platforms, including the adjustment loading platforms (i.e., support platforms 3 and inspection platforms 4).

Although described later in more detail, the adjustment stop target position information is information indicating a target position (adjustment stop target position) at which the traveling portion 22 is to be stopped on the traveling rail R (traveling path L, or more specifically the second path L2). As will be described later, adjustment of the ceiling transport vehicle 1 is performed by a detection target object M (see FIGS. 9 and 10), which is arranged on an inspection platform 4, being detected by the position detection sensor 29 built into the adjustment unit C supported by the ceiling transport vehicle 1. The adjustment unit C is placed on an inspection platform 4, and the adjustment stop target position is a target position for stopping the traveling portion 22 relative to the inspection platform 4 in order to at least receive the adjustment unit C from the inspection platform 4. Also, the adjustment move target position information is information indicating a target position (adjustment move target position) to which the support mechanism 24 is to be moved (raised/lowered, rotated, slid) relative to the traveling portion 22 while the ceiling transport vehicle 1 is stopped on the traveling rail R (traveling path L, or more specifically the second path L2).

The operation control portion 11 executes transport control and adjustment control based on transport instructions from the first control device H1 and the second control device 112, which are host controllers. When executing transport control and adjustment control, the operation control portion 11 controls the driving of various types of actuators provided in the ceiling transport vehicle 1. First, transport control will be described. Transport control is control for transporting a container W from the support platform 3 that is the transport source to the support platform 3 that is the transport destination by receiving the container W from the support platform 3 that is the transport source and then delivering the container W to the support platform 3 that is the transport destination. Reception transport processing, reception elevation processing, delivery traveling processing, and delivery elevation processing are executed in the stated order in response to a transport instruction for transporting the container W from the support platform 3 that is the transport source to the support platform 3 that is the transport destination.

In reception transport processing, based on transport stop target position information regarding the support platform 3 that is designated as the transport source, the operation control portion 11 causes the traveling portion 22 to travel to the transport stop target position of the support platform 3 that is the transport source, and then causes the traveling portion 22 to stop at the transport stop target position. The operation control portion 11 controls the travel motor 22*m* so as to cause the traveling portion 22 to stop at the transport stop target position.

In reception elevation processing, based on transport move target position information regarding the support platform 3 that is the transport source, the operation control portion 11 causes the support mechanism 24 to move to the transport move target position, then causes the gripping claws 24*a* to move to approaching positions, and then causes the support mechanism 24 to move to a traveling position. The operation control portion 11 controls the elevation motor 25*m*, the slide motor 26*m*, the rotation motor 27*m*, and the like. Accordingly, the container W that was supported on the support platform 3 that is the transport source becomes supported on the support mechanism 24 located at the traveling position.

In delivery traveling processing, based on transport stop target position information regarding the support platform 3 that is designated as the transport destination, the operation control portion 11 causes the traveling portion 22 to travel to the transport stop target position. The operation control portion 11 controls the travel motor 22*m* so as to cause the traveling portion 22 to travel while the container W is suspended, and then stop at the transport stop target position.

In delivery elevation processing, based on transport move target position information regarding the support platform 3 that is the transport destination, the operation control portion 11 causes the support mechanism 24 to move to the transport move target position, and then causes the gripping claws 24*a* to move to separated positions. The operation control portion 11 controls the elevation motor 25*m*, the slide motor 26*m*, the rotation motor 27*m*, and the like. Accordingly, the container W that was supported by the support mechanism 24 becomes placed on the support platform 3 that is the transport destination. Thereafter, the operation control portion 11 controls the elevation motor 25*m*, the slide motor 26*m*, the rotation motor 27*m*, and the like so as to cause the support mechanism 24 to move to the traveling position.

Figure 5:
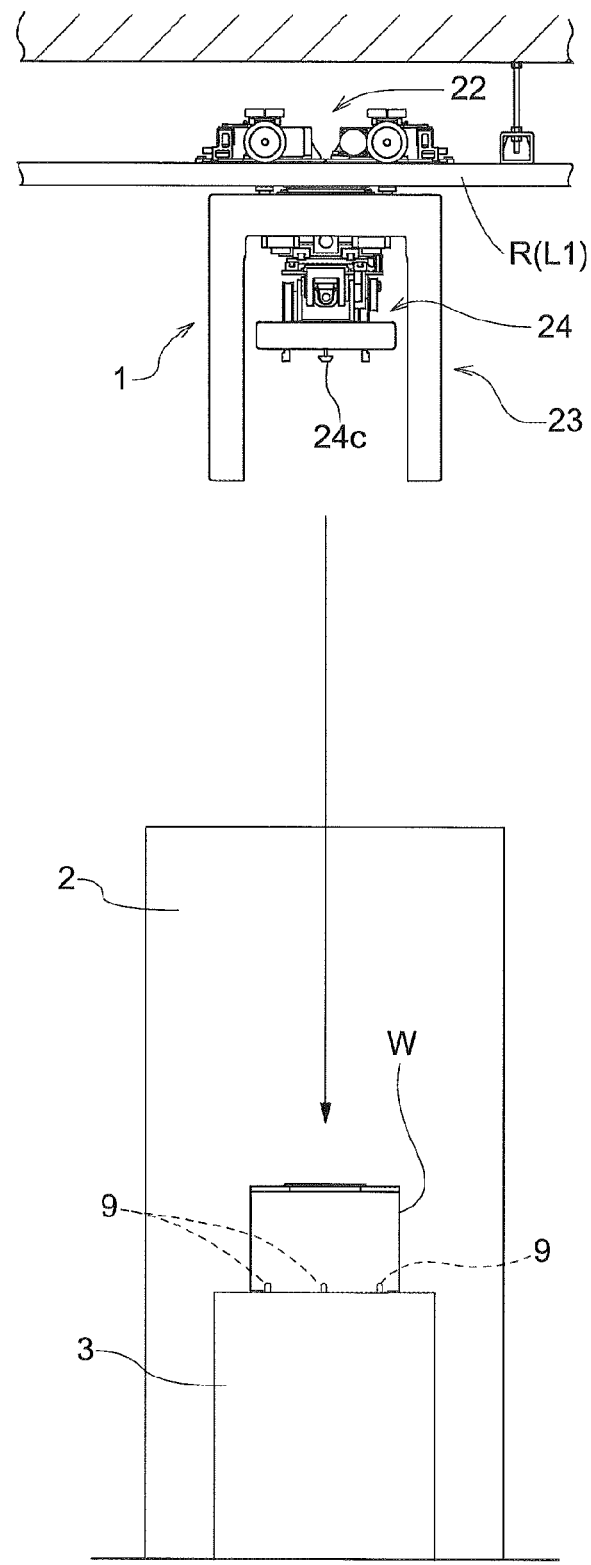
FIG. 5 is a side view of the ceiling transport vehicle and a support platform.

As shown in FIG. 3, the top recessed portion 8 is formed in the upper surface of the flange portion 6 (upper surface of the container W). The top recessed portion 8 is configured such that a pressing portion 24*c* provided on the support mechanism 24 engages with the top recessed portion 8 from above when the support mechanism 24 is lowered as shown in FIG. 5. For example, in reception elevation processing, when the ceiling transport vehicle 1 lowers the support mechanism 24, there are cases where the support mechanism 24 is shifted in the horizontal direction relative to the container W placed on the support platform 3. In this case as well, the pressing portion 24*c* comes into contact with and is guided by the inner surfaces of the top recessed portion 8, and thus the position of the support mechanism 24 in the horizontal direction is guided to a position that is appropriate for the container W.

Figure 6:
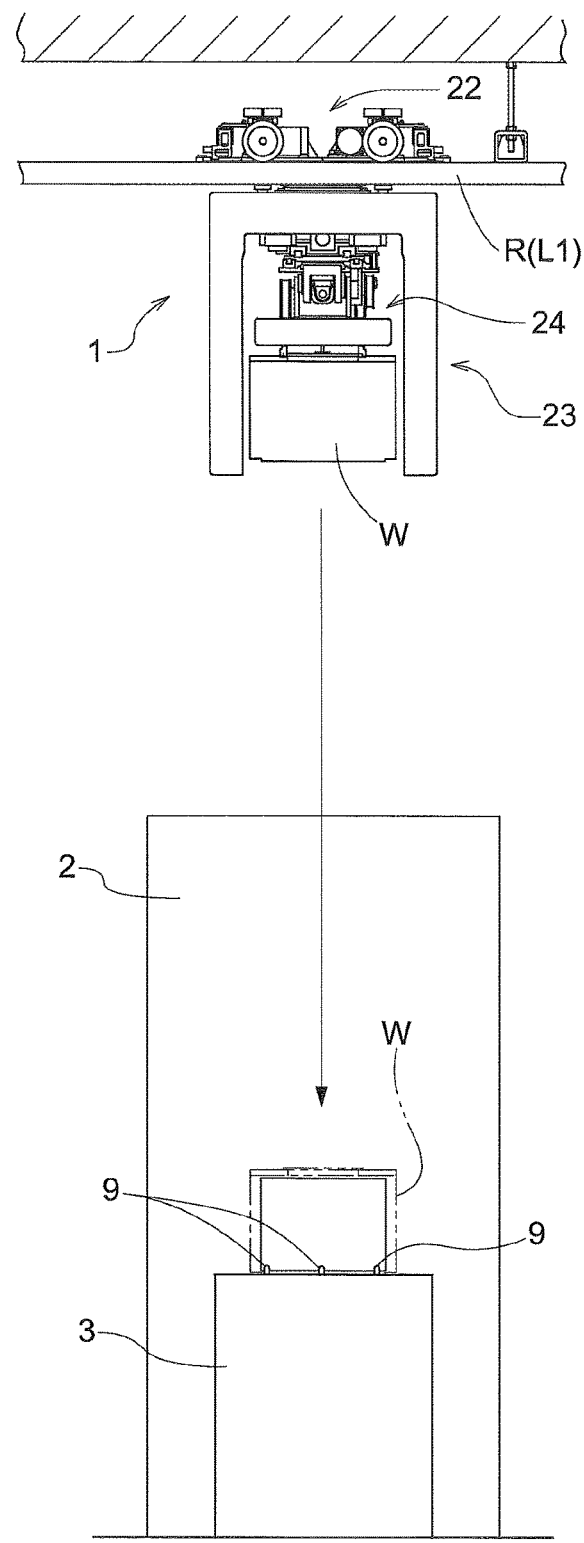
FIG. 6 is a side view of the ceiling transport vehicle and the support platform.

Also, as shown in FIG. 3, three groove-shaped bottom recessed portions 7 are provided in the bottom surface of the container W. As shown in FIG. 6, the bottom recessed portions 7 are provided at positions where positioning members 9 provided on the support platform 3 engage with the bottom recessed portions 7 from below when the container W is placed on the support platform 3 that is the transport destination. For example, in delivery elevation processing, when the support mechanism 24 descends and the container W is placed on the support platform 3, there are cases where the container W is shifted in the horizontal direction relative to the proper support position on the support platform 3. In this case as well, the positioning members 9 come into contact with the inner surfaces of the bottom recessed portions 7, and the container W moves in the horizontal direction, and thus the position of the container W in the horizontal direction is corrected to the proper support position on the support platform 3.

In this way, a certain amount of error in reception elevation processing and delivery elevation processing can be mitigated by the mechanical structure of the support mechanism 24 and the support platform 3. However, if the amount of error increases due to aged deterioration, wear, and the like of the ceiling transport vehicle 1, error can no longer be mitigated by such mechanical structures, and there are cases where articles such as the container W can no longer be transferred appropriately. For example, there are cases where abrasion of the traveling wheels 22*a* or the like causes the transport stop target position indicated by the transport stop target position information to be shifted from the ideal transport stop target position. Also, due to aged deterioration and wear of the elevation driving portion 25, there are cases where there is a gradual increase in the shift between the transport move target position indicated by the transport move target position information and the ideal transport move target position. In general, periodic inspection or the like is performed at a determined interval, and adjustment is performed at that time. However, there are also cases where the amount of error becomes large before periodic inspection due to operation rate differences, individual differences, and the like between ceiling transport vehicles 1. Accordingly, it is desirable that appropriate adjustment is performed at appropriate times according to individual ceiling transport vehicles 1.

In many cases, a ceiling transport vehicle 1 is moved from the first area E1 to the second area E2, and such adjustment is performed manually by an operator in the second area E2, for example. For this reason, adjustment is time-consuming, and this becomes one factor in the decrease of the operation rate of the ceiling transport vehicle 1. In the present embodiment, the amount of time required for adjustment is shortened by automating adjustment. Also, the adjustment duration can be shortened even if a new ceiling transport vehicle 1 is added (even if the number of vehicles is increased), thus making it possible to swiftly improve the transport performance of the article transport facility.

Figure 7:
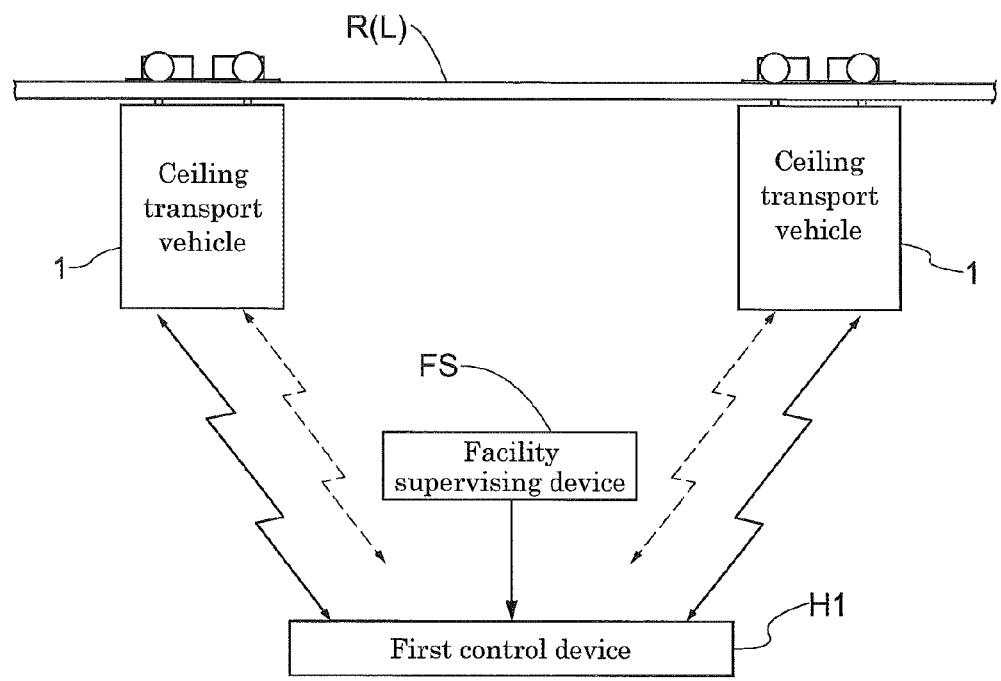
FIG. 7 is an illustrative diagram schematically showing a system configuration of the article transport facility.

FIG. 7 is an illustrative diagram schematically showing the system configuration of the article transport facility. FIG. 7 shows the system configuration for monitoring the running statuses of the ceiling transport vehicles 1. As described above, the first control device H1 designates a ceiling transport vehicle 1 and uses wireless communication to give the ceiling transport vehicle 1 an operation instruction for causing the ceiling transport vehicle 1 to operate (a container transport instruction for transporting a container W (article), that is to say an article transport instruction). In response to the received operation instruction, the ceiling transport vehicle 1 sends an acknowledgement to the first control device H1, and starts transport control based on the operation instruction.

Upon starting transport control, the ceiling transport vehicle 1 transmits operation information (e.g., traveling/stopped, transfer success/failure, number of attempts until transfer success, and error information) along with information specifying the ceiling transport vehicle 1 (attribute information) without specifying the reception destination. In other words, the operation information need only be transmitted one-way from the ceiling transport vehicle 1 (so-called broadcast). In the article transport facility, multiple ceiling transport vehicles 1 perform transport control at the same time under autonomous control. The first control device H1 uses polling processing or the like to successively receive operation information transmitted by multiple ceiling transport vehicles 1.

If the operation information transmitted from the ceiling transport vehicle 1 is transmitted in such a one-way manner, devices other than the first control device H1 can also receive and store that information. In the present embodiment, a facility supervising device FS is provided, and this facility supervising device FS acquires and stores operation information. The operation information also includes attributes for specifying each ceiling transport vehicle 1. Accordingly, by storing operation information, the facility supervising device FS can store past operation statuses as running information for each ceiling transport vehicle 1.

By acquiring the information included in each piece of operation information along with multiple pieces of operation information regarding the same ceiling transport vehicle 1, the facility supervising device FS successively acquires operation status information that includes at least the transport count and the travel time of each ceiling transport vehicle 1. The facility supervising device FS stores successively acquired operation status information pieces as running information. Furthermore, based on the running information, the facility supervising device FS selects a ceiling transport vehicle 1 that needs adjustment as an adjustment target vehicle. The facility supervising device FS selects the ceiling transport vehicle 1 that needs adjustment based on, for example, the running time of the ceiling transport vehicle 1, the elapsed time since the last adjustment, and the transfer retry rate in a predetermined latest adjustment necessity determination period. Note that the retry rate is a ratio in which the numerator is the number of successful transfers in retries after transfer has failed with respect to one transfer instance (or the number of transfer instances with successful transfer by retrying after transfer has failed), and in which the denominator is the total number of transfer instances in the adjustment necessity determination period.

The facility supervising device FS notifies the selection result to the first control device H1. The facility supervising device FS and the first control device H1 are fixed devices that are disposed on the ground side, and FIG. 7 shows an example of an aspect in which information is transmitted from the facility supervising device FS to the first control device H1 over a wired route. However, this is not intended to prevent this transmission of information from being performed by wireless communication.

The first control device H1 that received the adjustment target vehicle selection result from the facility supervising device FS then gives a withdrawal instruction to a ceiling transport vehicle 1 (the adjustment target vehicle) based on the selection result. The withdrawal instruction is an instruction for causing the ceiling transport vehicle 1 (adjustment target vehicle) to withdraw from the first area E1 to the second area E2. Specifically, the operation instruction given by the first control device H1 includes at least a transport instruction (article transport instruction) and a withdrawal instruction.

Based on the withdrawal instruction from the first control device H1, the operation control portion 11 of the ceiling transport vehicle 1 designated as the adjustment target vehicle causes the ceiling transport vehicle 1 to withdraw from the first area E1 to the second area E2. In other words, the operation control portion 11 of the adjustment target vehicle causes the ceiling transport vehicle 1 (adjustment target vehicle) to enter the second path L2 based on the withdrawal instruction. Specifically, the guide roller solenoid 22s at a diverging portion J1 is driven to change the orientation of the guide rollers 22b (change to the second position on the left side in this present embodiment). Accordingly, the ceiling transport vehicle 1 (adjustment target vehicle) withdraws from the first path L1 and enters the second path L2.

The position of the ceiling transport vehicle 1 on the traveling path L is known to the ceiling transport vehicle 1 that performs autonomous traveling. The position is also transmitted to the first control device H1 as the operation information described above. The operation control portion 11 of the ceiling transport vehicle 1 (adjustment target vehicle) determines whether or not it has entered the second path L2. For example, in the case where coordinate markers are arranged along the traveling path L, and the ceiling transport vehicle 1 is provided with a sensor for detecting the coordinate markers, the fact that the ceiling transport vehicle 1 enters the second path L2 can be determined based on the result of detecting a coordinate marker that is on the second path L2 side relative to the diverging portion J1. Upon detecting that entrance into the second path L2 is complete, the operation control portion 11 transmits the determination result to the communication control portion 10. Based on this determination result, the communication control portion 10 changes the communication destination from the first control device H1 to the second control device H2.

When communication with the ceiling transport vehicle 1 (adjustment target vehicle) is established, the second control device H2 transmits an adjustment instruction to the ceiling transport vehicle 1 (adjustment target vehicle). Based on adjustment stop target position information regarding an inspection platform 4 (the adjustment loading platform) stored in the profile storage portion 12, the operation control portion 11 of the ceiling transport vehicle 1 (adjustment target vehicle) causes the ceiling transport vehicle 1 to travel to and stop at the adjustment stop target position.

In response to the adjustment instruction from the second control device H2, the operation control portion 11 of the ceiling transport vehicle 1 (adjustment target vehicle) performs an adjustment operation with use of the adjustment unit C (adjustment device) as will be described later. Furthermore, based on results obtained by the adjustment operation, the operation control portion 11 updates transport profile information stored in the profile storage portion 12. After the transport profile information has been updated, the communication control portion 10 of the ceiling transport vehicle 1 (adjustment target vehicle) changes the communication destination from the second control device H2 to the first control device H1.

Based on a transport request from an even higher host controller such as a production management device, the first control device H1 designates the support platform 3 (loading platform) to which the ceiling transport vehicle 1 (adjustment target vehicle) is to be dispatched, and transmits a transport instruction to the ceiling transport vehicle 1. The operation control portion 11 of the ceiling transport vehicle 1 causes the ceiling transport vehicle 1 (adjustment target vehicle) to merge from the second area E2 into the first area E1 and then transport a container W based on the transport instruction.

The following describes a specific example of adjustment control. In the present embodiment, adjustment is performed by the ceiling transport vehicle 1 receiving the adjustment unit C (adjustment device) from one inspection platform 4 (the adjustment loading platform) instead of the container W, and then delivering the adjustment unit C to another inspection platform 4. Specifically, in the second area E2, the adjustment unit C is suspended by the support mechanism 24 of the ceiling transport vehicle 1. The adjustment unit C (adjustment device) acquires adjustment data while being raised/lowered by the elevation driving portion 25 of the ceiling transport vehicle 1 (adjustment target vehicle), calculates transport profile information (updating profile information) corresponding to the adjustment target vehicle, and then transmits the transport profile information to the adjustment target vehicle as update data. Note that update data is not limited to being transport profile information, and may be difference information indicating differences from original transport profile information.

Figure 8:
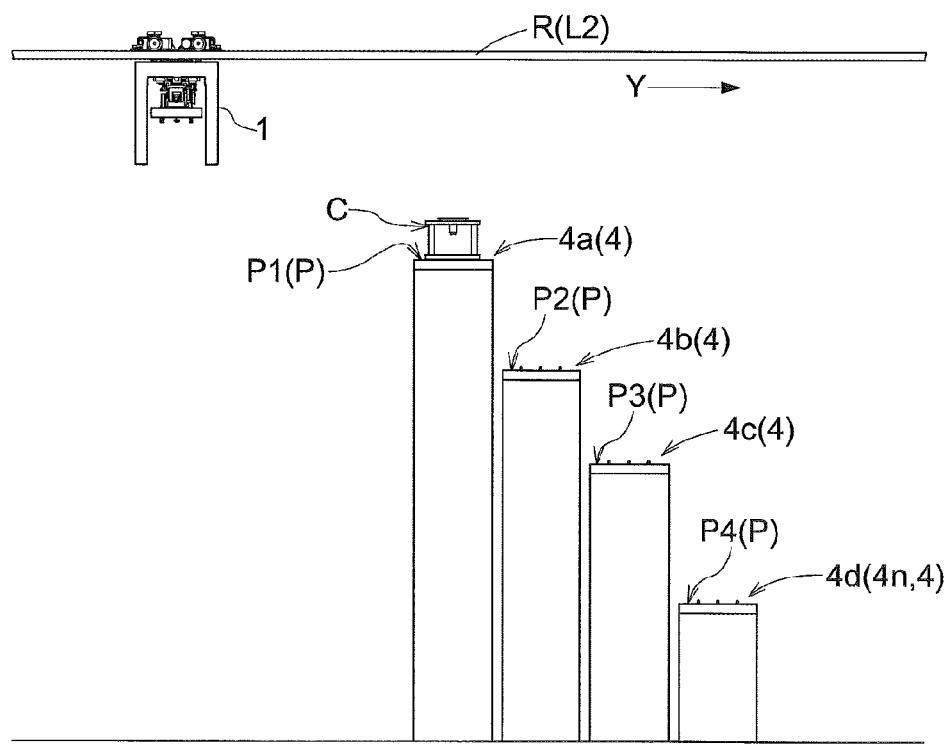
FIG. 8 is a side view of an example of an inspection platform arrangement.

The second area E2 is provided with an inspection platform 4 (i.e., an adjustment loading platform) that has an adjustment loading surface P configured such that the adjustment unit C can be placed thereon in the same manner as the manner in which a container W is placed on a support platform 3. Some of the support platforms 3 arranged in the first area E1 have different ground heights. Accordingly, in adjustment control that is carried out in the second area, it is preferable that the adjustment unit C is placed on at least two adjustment loading surfaces P (P1, P2, . . . ) that have different heights, and adjustment data is acquired when raising/lowering the adjustment unit C from each of the adjustment loading surfaces P (P1, P2, . . . ). As shown in FIG. 8, in the present embodiment, four loading platforms (inspection platforms 4) having adjustment loading surfaces P (P1, P2, P3, P4) with different heights are provided. It is preferable that the ground heights of the adjustment loading surfaces P are heights that correspond to the various ground heights of the support platforms 3. If the ground heights of the adjustment loading surface correspond to the ground heights of the loading platforms on which articles are actually placed, it is possible to perform adjustment in aspects that correspond to actual use aspects. As a result, it is possible to perform appropriate adjustment that is suited to actual operation.

The adjustment unit C is raised and lowered by the elevation driving portion 25 from and to loading platforms with different heights, and transport profile information is calculated based on adjustment data acquired when the adjustment unit C is raised and lowered from and to the respective heights. As shown in FIGS. 1 and 8, in the present embodiment, four inspection platforms 4 having adjustment loading surfaces P for placing the adjustment unit C at different heights are arranged along the second path L2, and the adjustment target vehicle transfers the adjustment unit C between the different inspection platforms 4 while moving along the second path L2. The adjustment unit C acquires adjustment data for each of the inspection platforms 4.

FIG. 8 shows an example in which four inspection platforms 4, namely a first inspection platform 4a, a second inspection platform 4b, a third inspection platform 4c, and a fourth inspection platform 4d, are arranged in order of descending ground height. The first inspection platform 4a has a first adjustment loading surface P1, the second inspection platform 4b has a second adjustment loading surface P2, the third inspection platform 4c has a third adjustment loading surface P3, and the fourth inspection platform 4d has a fourth adjustment loading surface P4. In the present embodiment, the first inspection platform 4a is the storage location for the adjustment unit C, and the adjustment unit C is placed on the first inspection platform 4a. The ceiling transport vehicle 1 that is the adjustment target vehicle first performs reception transport processing and reception elevation processing on the adjustment unit C placed on the first inspection platform 4a, and then performs delivery traveling processing and delivery elevation processing with respect to the second inspection platform 4b. Each time the adjustment unit C performs the aforementioned types of processing, it acquires adjustment data and calculates transport profile information corresponding to the adjustment target vehicle.

Next, reception elevation processing is performed on the adjustment unit C placed on the second inspection platform 4b, and then delivery traveling processing and delivery elevation processing with respect to the third inspection platform 4c are performed. Each time the adjustment unit C performs the aforementioned types of processing, it similarly acquires adjustment data and calculates transport profile information corresponding to the adjustment target vehicle. Next, reception elevation processing is performed on the adjustment unit C placed on the third inspection platform 4c, and then delivery traveling processing and delivery elevation processing with respect to the fourth inspection platform 4d are performed. Each time the adjustment unit C performs the aforementioned types of processing, it similarly acquires adjustment data and calculates transport profile information corresponding to the adjustment target vehicle. Lastly, reception elevation processing is performed on the adjustment unit C placed on the fourth inspection platform 4d, and then delivery traveling processing and delivery elevation processing with respect to the first inspection platform 4a are performed via a learning route Lt (see FIG. 1) provided in the second area E2. Each time the adjustment unit C performs the aforementioned types of processing, it similarly acquires adjustment data and calculates transport profile information corresponding to the adjustment target vehicle.

The above series of transfer processing and calculation is considered to be one loop, and the same loop of transfer processing and calculation is repeated multiple times. For example, in consideration of measurement error and the like, the loop of transfer processing and calculation is performed three times, and transport profile information for updating is determined using an average or standard deviation. Of course, this processing may be cut down to one loop if sufficient precision is obtained.

Figure 9:
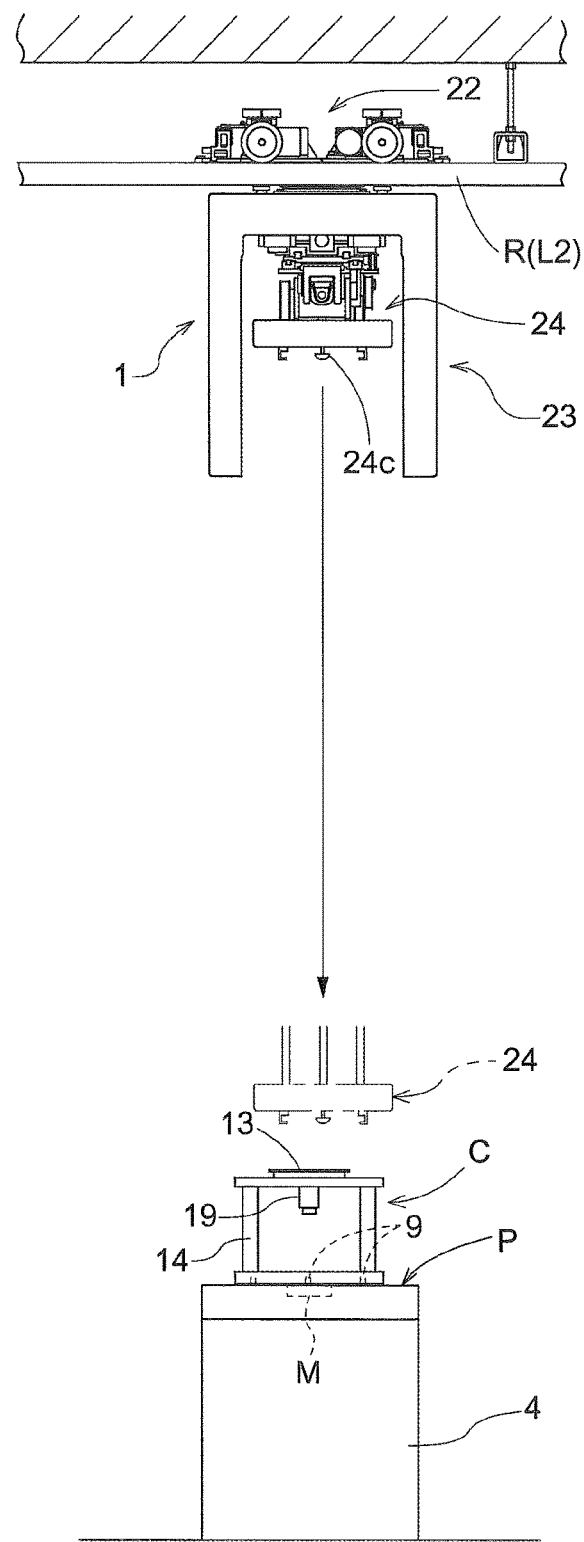
FIG. 9 is a side view of the relationship between the ceiling transport vehicle and an adjustment unit placed on an inspection platform.
Figure 10:
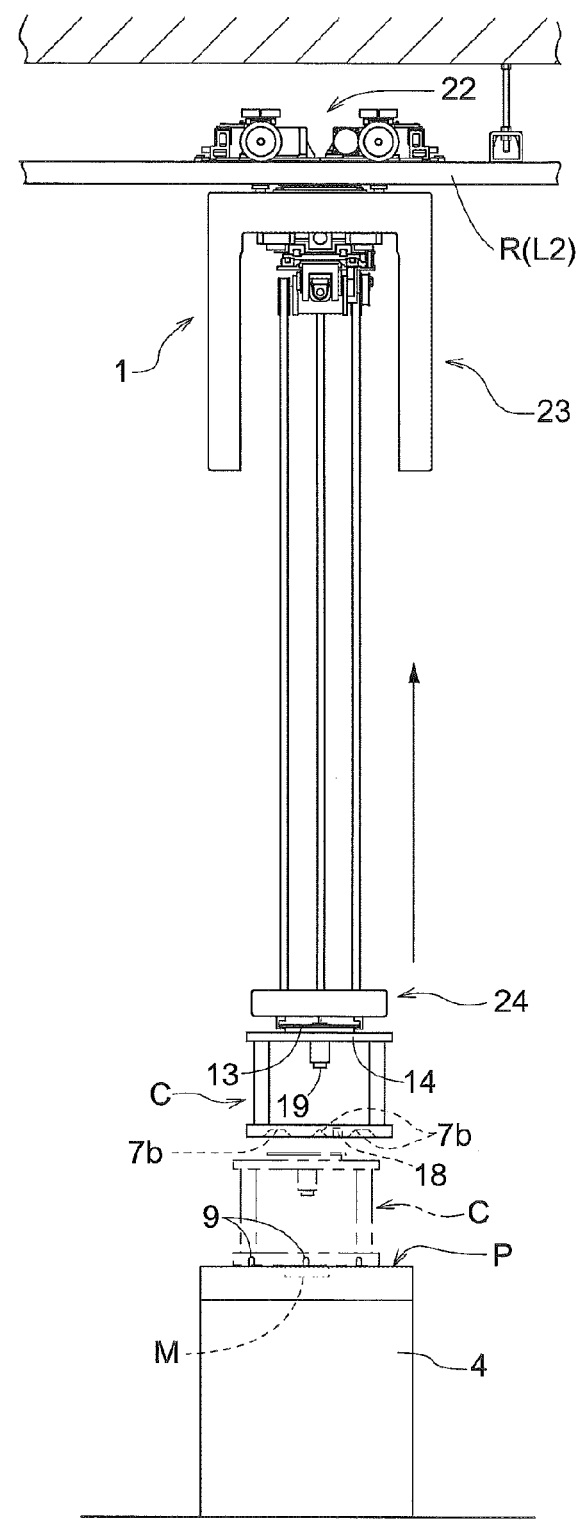
FIG. 10 is a side view of the relationship between a support platform and the adjustment unit when suspended.

FIGS. 9 and 10 show examples of behavior of the ceiling transport vehicle 1 when receiving the adjustment unit C from an inspection platform 4 instead of the container W. As described above, the ceiling transport vehicle 1 can support the adjustment unit C instead of the container W and transport the adjustment unit C in a manner similar to the manner in which it transports the container W. Similarly to the container W, a unit flange portion 13 is provided on the upper end portion of the adjustment unit C, and the unit flange portion 13 is suspended by the support mechanism 24 of the ceiling transport vehicle 1. A unit main body portion 14 is provided at a location that is below the unit flange portion 13 and corresponds to the accommodating portion 5 of the container W. A distance sensor 18 and an image sensor 19 are supported on the unit main body portion 14.

Similarly to the container W, the bottom surface of the unit main body portion 14 (the bottom surface of the adjustment unit C) is provided with three groove-shaped bottom recessed portions (unit bottom recessed portions 7*b*) that are recessed upward (see FIG. 10). Also, similarly to the support platform 3, the upper surface of the inspection platform 4 is provided with positioning members 9 at positions for engaging with the adjustment unit C from below. For this reason, when the adjustment unit C is transferred to the inspection platform 4, even if the adjustment unit C is shifted in the horizontal direction relative to the proper support position on the support platform 3, the positioning members 9 come into contact with the inner surfaces of the unit bottom recessed portions 7*b*, and the adjustment unit C moves in the horizontal direction, and thus the position of the adjustment unit C in the horizontal direction is corrected to the proper support position. Accordingly, even if error arises in the delivery traveling processing and the delivery elevation processing of the adjustment unit C with respect to one of the inspection platforms 4, it is also possible to place the adjustment unit C at a prescribed position. Accordingly, subsequent reception transport processing and reception elevation processing with respect to that inspection platform 4 can be performed appropriately.

Also, similarly to the container W, the upper surface of the unit flange portion 13 (the upper surface of the adjustment unit C) is provided with a unit top recessed portion (not shown) that is recessed downward with a conical shape. The unit top recessed portion is configured such that the pressing portion 24*c* provided on the support mechanism 24 engages with the top recessed portion from above when the support mechanism 24 is lowered as shown in FIG. 9. For example, in reception elevation processing, when the ceiling transport vehicle 1 lowers the support mechanism 24, there are cases where the support mechanism 24 is shifted in the horizontal direction relative to the adjustment unit C placed on the inspection platform 4. In this case as well, the pressing portion 24*c* comes into contact with and is guided by the inner surfaces of the unit top recessed portion, and thus the position of the support mechanism 24 in the horizontal direction is guided to a position that is appropriate for the adjustment unit C.

As shown in FIG. 4, the ceiling transport vehicle 1 is provided with an adjustment communication portion 15 for exchanging various types of information with the unit communication portion 16 of the adjustment unit C by wireless communication. The adjustment unit C is also provided with the distance sensor 18, the image sensor 19, the unit communication portion 16, and a unit control portion 17. The distance sensor 18 is a laser range finder for example, and measures the distance between the adjustment loading surface P and the bottom portion of the adjustment unit C, as will be described later with reference to FIG. 11. The image sensor 19 is a two-dimensional image sensor for example, and is for capturing images of the detection target object M provided on the inspection platform 4 (preferably the adjustment loading surface P). The unit communication portion 16 includes an antenna and a communication control circuit, and exchanges various types of information with the ceiling transport vehicle 1 by short-range wireless communication. The unit control portion 17 includes a microcomputer or the like as its core, and controls operations of the distance sensor 18, the image sensor 19, and the unit communication portion 16, as well as performs image recognition on captured images of the detection target object M captured by the image sensor 19 and calculates update data such as transport profile information for updating, based on the image recognition results.

As shown in FIG. 9, in the case where the adjustment unit C is lowered toward the adjustment loading surface P, the ceiling transport vehicle 1 first drives the elevation motor 25*m* so as to feed out the take-up belt 25*b* until the adjustment unit C is seated on (placed on) the adjustment loading surface P. As described above, the feed amount of the take-up belt 25*b* is calculated in units of pulses by an encoder. Whether or not the adjustment unit C is seated on the adjustment loading surface P is determined by the elevation driving portion 25 or the operation control portion 11 based on a change in tensile force acting on the take-up belt 25*b*, for example. After it has been determined that the adjustment unit C is seated on the adjustment loading surface P, the ceiling transport vehicle 1 drives the elevation motor 25*m* so as to slowly start taking up the take-up belt 25*b*.

Figure 11:
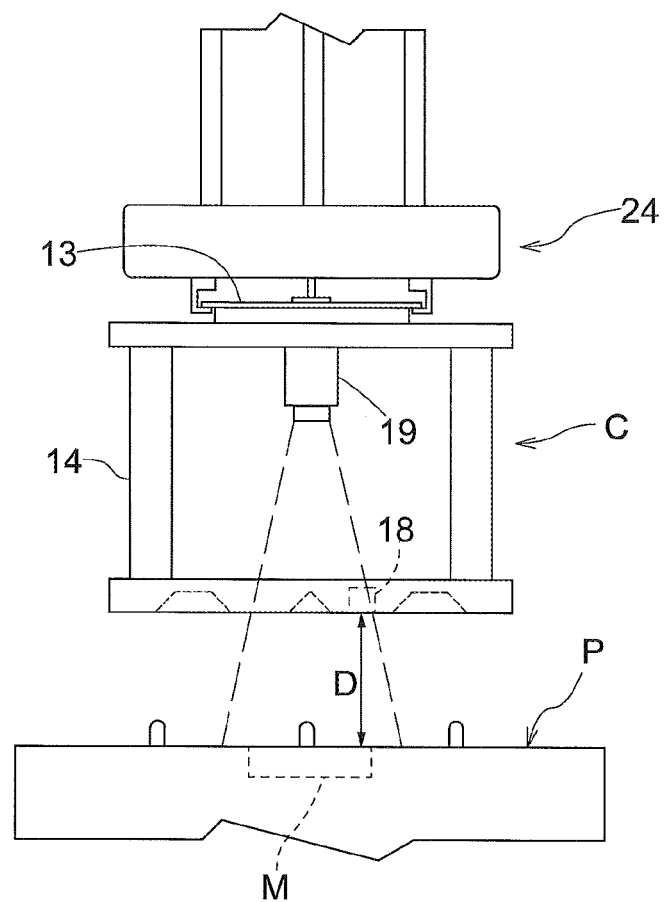
FIG. 11 is an enlarged view of the positional relationship between the adjustment unit and an adjustment platform surface while adjustment is being carried out.

As shown in FIG. 11, due to the take-up belt 25*b* being taken up, the adjustment unit C rises up from the adjustment loading surface P. The distance sensor 18 measures the distance between the adjustment loading surface P and the bottom portion of the adjustment unit C, and then transmits the measurement results to the ceiling transport vehicle 1. When the distance falls within a predetermined allowable range with respect to an adjustment separation distance D, the taking up of the take-up belt 25*b* is stopped. Accordingly, the adjustment unit C is suspended by the support mechanism 24 in a state of being separated from the adjustment loading surface P by the adjustment separation distance D. The number of pulses in the state where tensile force is applied to the take-up belt 25*b* is acquired as the feed amount of the take-up belt 25*b* and transmitted to the adjustment unit C. Note that the adjustment separation distance D is approximately 5 to 10 [mm] for example, and error of approximately 2.5 to 3 [mm] is allowed in both the plus and minus directions. For example, if the adjustment separation distance D is 5 [mm] and the allowable error is ±2.5 [mm], the adjustment unit C becomes suspended by the support mechanism 24 when the distance between the adjustment loading surface P and the bottom portion of the adjustment unit C falls within the range of 2.5 to 7.5 [mm]. The image sensor 19 captures an image of the detection target object M in this state.

The detection target object M is constituted to include a two-dimensional code, for example. The adjustment unit C (unit control portion 17) identifies offset amounts of the detection target object M relative to the image sensor 19 in the traveling direction, the width direction, and about the longitudinal axis based on the size, angle, position, and the like of the detection target object M in the image captured by the image sensor 19. The position of the image sensor 19 is fixed on the adjustment unit C, thus making it possible to identify offset amounts of the detection target object M relative to the adjustment unit C in the traveling direction, the width direction, and about the vertical axis. Note that a configuration is possible in which the distance sensor 18 is not provided, and the unit control portion 17 calculates the distance between the adjustment loading surface P and the bottom portion of the adjustment unit C based on the size of the detection target object M in the image captured by the image sensor 19. Also, even if the distance sensor 18 is provided, error in the distance is allowed as described above, and therefore a configuration is possible in which the distance is corrected based on the size of the detection target object M in the image captured by the image sensor 19, and the feed amount of the take-up belt 25b is also corrected.

Figure 12:
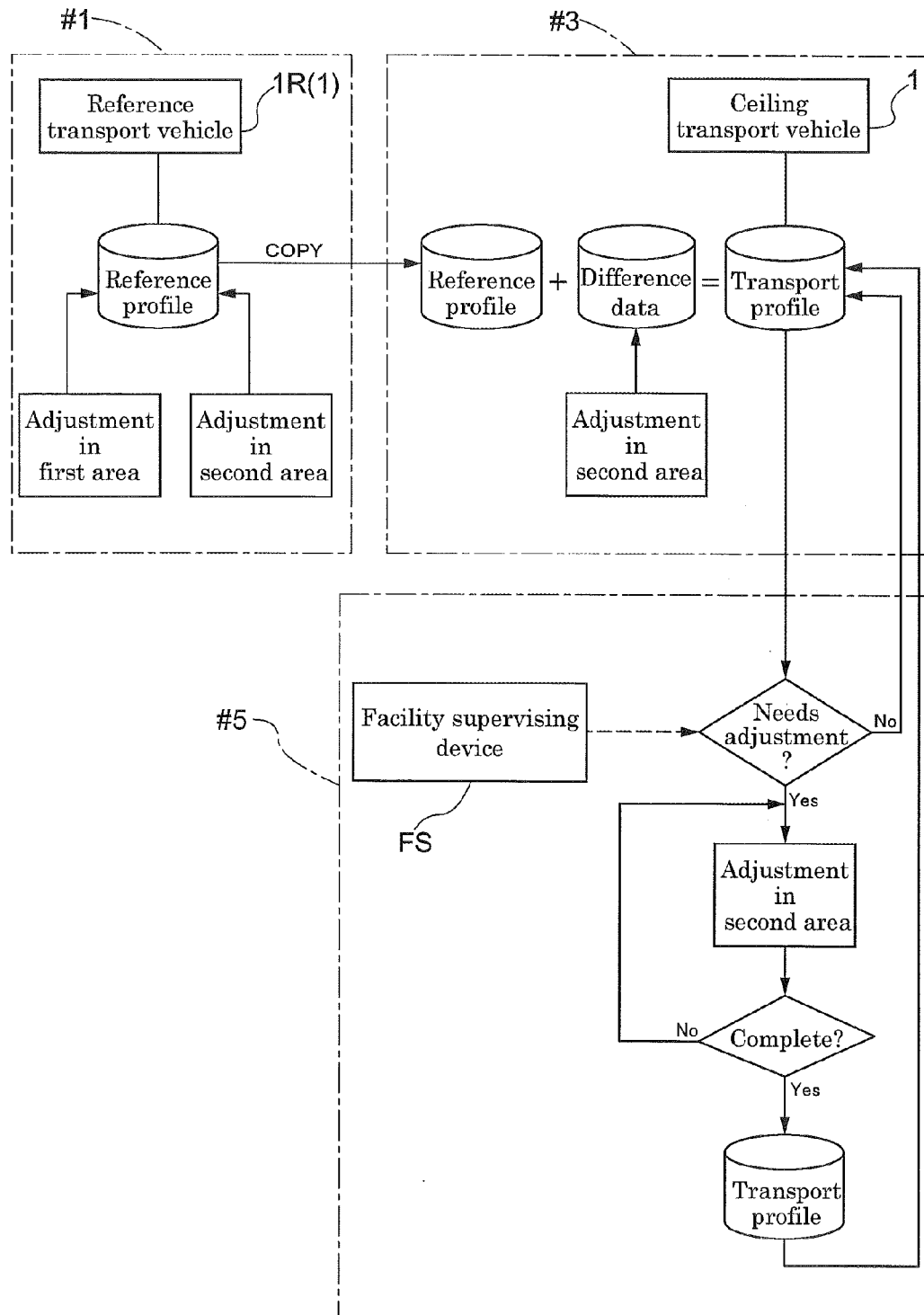
FIG. 12 is a state transition diagram schematically showing the generation and updating of a transport profile.

FIG. 12 is a state transition diagram schematically showing the generation and updating of a transport profile. When a new article transport facility is constructed, transport profile information is prepared for a reference transport vehicle 1R, which is a ceiling transport vehicle 1 that is to serve as a reference among all of the ceiling transport vehicles 1 in the article transport facility. This transport profile information is profile information that is to serve as a reference for all of the other ceiling transport vehicles 1 in the article transport facility, and will be referred to as reference profile information. The reference profile information is generated by actually transporting and delivering articles (the container W and the adjustment unit C, or another alternative reference article) among all of the loading platforms, including adjustment loading platforms, that is to say all of the support platforms 3 in the first area E1 and all of the inspection platforms 4 in the second area E2 (reference profile preparation phase #1).

When a ceiling transport vehicle 1 other than the reference transport vehicle 1R is added to the article transport facility, the reference profile information is written to the profile storage portion 12 of the ceiling transport vehicle 1 that is to be added. Next, the ceiling transport vehicle 1 is sent to the second area E2, and adjustment is performed as described above. During adjustment, reception transport processing, reception elevation processing, delivery traveling processing, and delivery elevation processing are executed based on the reference profile information, and individual differences between the reference transport vehicle 1R and the ceiling transport vehicle 1 being added are extracted as difference data. Unique transport profile for the ceiling transport vehicle 1 is generated based on the reference profile information and the difference data, and then written to the profile storage portion 12 (transport profile initial setting phase #3). After the unique transport profile information has been set, the ceiling transport vehicle 1 is introduced to the first area E1.

After the article transport facility has been running, a ceiling transport vehicle 1 that needs adjustment is selected as the adjustment target vehicle based on information from the facility supervising device FS, as described above. The adjustment target vehicle withdraws from the first area E1 to the second area E2, and adjustment is performed as described above. When adjustment is complete, new transport profile information is stored in the profile storage portion 12 of the adjustment target vehicle (transport profile adjustment phase #5). After adjustment is complete, the ceiling transport vehicle 1 is reintroduced to the first area E1.

Other Embodiments

The following describes other embodiments. Note that the configurations of the embodiments described below are not limited to being applied on their own, and they can also be applied in combination with the configurations of other embodiments as long as no contradiction arises.

(1) In the example described above, four adjustment loading platforms (inspection platforms 4) with different heights are provided. However, the number of inspection platforms 4 is not limited to four. It is sufficient that two or more inspection platforms 4 with different heights are provided, and the number thereof may be less than four, or five or more. In other words, it is sufficient that in the second area E2, the adjustment unit C (adjustment device) is placed on at least two adjustment loading surfaces P that have different heights, and transport profile information is calculated based on adjustment data acquired when the adjustment unit C is raised from and lowered to the adjustment loading surfaces P. Preferably, at least two adjustment loading platforms (inspection platforms 4) on which the adjustment unit C (adjustment device) can be placed at different heights are arranged along the second path L2, and the adjustment target vehicle transfers the adjustment unit C (adjustment device) to or from different adjustment loading platforms (inspection platforms 4) while moving along the second path L2.

In the above description, the series of transfer processing and calculation when transferring the adjustment unit C between inspection platforms 4 is considered to be one loop, and the same loop of processing and calculation is repeated multiple times. Although the above description gives an example in which four inspection platforms 4 are provided, in the case where the number of inspection platforms 4 is a number other than four, for example in the case where n (n being a natural number) inspection platforms 4 are provided and the last inspection platform 4 along the second path L2 is the n-th inspection platform 4n (see FIG. 8), the same series of transfer processing and calculation is carried out as one loop up to and including the n-th inspection platform 4.

(2) In the example described above, four adjustment loading platforms (inspection platforms 4) are arranged along the second path L2 in order of descending or ascending ground height, for example. However, a configuration is possible in which inspection platforms 4 having different heights are arranged without giving consideration to the order of ground heights. For example, in the case where three or more inspection platforms 4 having different heights are provided, the inspection platforms 4 may be arranged without giving consideration to the order of ground heights.

Figure 13:
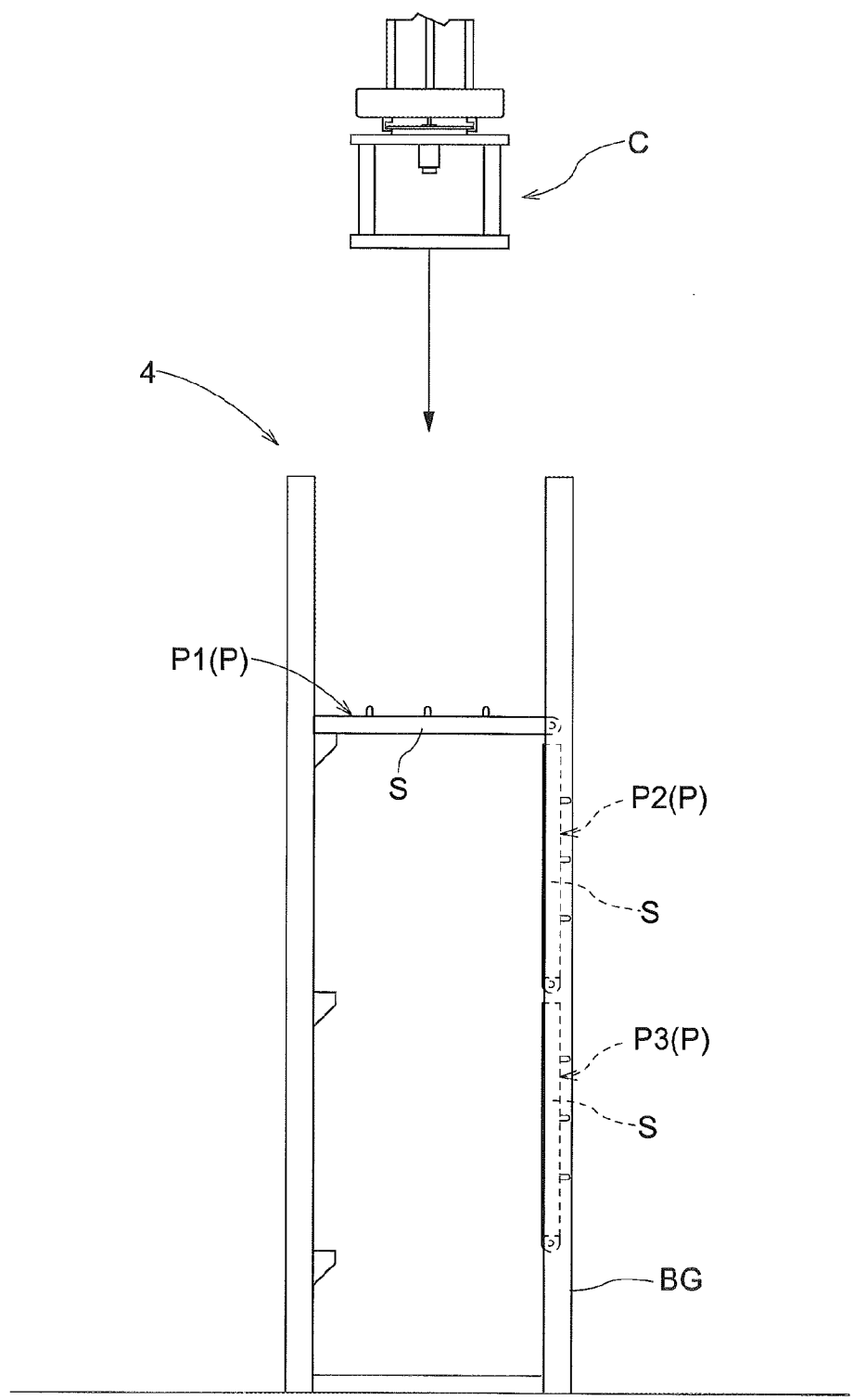
FIG. 13 is a side view showing another example of an inspection platform.

(3) In the example described above, two or more inspection platforms 4 having different heights are provided. In other words, in the example described above, adjustment is performed by the ceiling transport vehicle 1 receiving the adjustment unit C from one inspection platform 4 instead of the container W, and then delivering the adjustment unit C to another inspection platform 4. Specifically, in the example described above, at least two inspection platforms 4 on which the adjustment unit C can be placed at different heights are provided, the adjustment unit C is raised and lowered by the elevation driving portion 25 from and to the at least two inspection platforms 4 with different heights, and transport profile information is calculated based on adjustment data acquired when the adjustment unit C is raised from and lowered to the at least two or more heights. However, adjustment may be performed with use of one inspection platform 4 as shown in FIG. 13. Specifically, a configuration is possible in which one inspection platform 4 is provided in the case where the inspection platform 4 has adjustment loading surfaces P on which the adjustment unit C can be placed at at least two different heights in the same manner as the manner in which the container W is placed on a support platform 3, and the adjustment unit C can acquire adjustment data when being raised from and lowered to the adjustment loading surfaces P.

In one aspect, a configuration is possible in which adjustment is performed by the ceiling transport vehicle 1 receiving the adjustment unit C from an inspection platform 4 whose adjustment loading surface P is set at a certain height (e.g., an inspection platform 4 set to have a first adjustment loading surface P1), and then the ceiling transport vehicle 1 again delivering the adjustment unit C to the same inspection platform 4 whose adjustment loading surface P has been re-set to a different height (e.g., the same inspection platform 4 set to have a second adjustment loading surface P2 or a third adjustment loading surface P3). In other words, if the ground height of the adjustment loading surface P of the inspection platform 4 is variable as shown in FIG. 13, adjustment of the ceiling transport vehicle 1 can be performed by performing transfer from and to multiple heights using a single inspection platform 4.

Specifically, a configuration is possible in which the article transport facility includes an inspection platform 4 that has variable-height loading portions S on which the adjustment unit C can be placed, such that the adjustment unit C can be placed on the adjustment loading surfaces P at at least two different heights, and the adjustment unit C acquires adjustment data when being raised from and lowered to the loading portions S set at at least two different heights. For example, a configuration is preferable in which the loading portions S span beam portions BG, and the orientations thereof can be changed between a state in which the adjustment loading surface P extends along the vertical direction (up-down direction) and a state in which the adjustment loading surface P extends along the horizontal direction, by being swung by an actuator (not shown). Also, it is preferable that this actuator is controlled by the second control device H2.

(4) In the example described above, the ceiling transport vehicle 1 that needs adjustment is selected as the adjustment target vehicle by the facility supervising device FS, and the first control device H1 receives a notification of the selection result and gives a withdrawal instruction to the adjustment target vehicle. However, a configuration is possible in which the facility supervising device FS is not provided, and the first control device H1 selects the adjustment target vehicle. In this case, the first control device H1 may store running information and make the selection based on the running information, or may make the selection according to a simple running time or the elapsed time since the last time adjustment was performed. Also, the selection may be made based on the most recent retry rate or the like.

(5) In the example described above, the communication destination is switched from the first control device H1 to the second control device H2 after the adjustment target vehicle has received the withdrawal instruction, and furthermore the adjustment target vehicle has entered the second path L2. With this configuration, a ceiling transport vehicle 1 that is no longer controlled by the first control device H1 never remains in the first area E1, and therefore the hindrance of container W transport in the first area E1 can be more reliably suppressed. However, given that the traveling position and the like of the ceiling transport vehicle 1 are transmitted from the ceiling transport vehicle 1 as operation information, the first control device H1 can know the traveling position of the ceiling transport vehicle 1 that has been designated as the adjustment target vehicle. Accordingly, when it is determined that the adjustment target vehicle is traveling along the first path L1 at a point before diverging to the second path L2, it is also possible to transmit a transport instruction to another ceiling transport vehicle 1. Accordingly, the communication control portion 10 of the adjustment target vehicle may switch the communication destination before the adjustment target vehicle enters the second path L2. For example, the communication control portion 10 may switch the communication destination on the condition of receiving a withdrawal instruction, or the operation control portion 11 may switch the communication destination on the condition of the start of a path change to the second path L2.

(6) In the example described above, the adjustment unit C constitutes the adjustment device on its own, and the unit control portion 17 of the adjustment unit C calculates a transport profile. However, the adjustment device arranged in the second area E2 may be constituted by a combination of the adjustment unit C and an adjustment control device (not shown) that is fixedly disposed on the ground side. Note that in this case, it is preferable that the adjustment unit C and the adjustment control device perform wireless communication with each other.

(7) Note that the configurations disclosed in the embodiments described above can be applied in combination with the configurations of other embodiments as long as no contradiction arises. Regarding other configurations as well, the embodiments disclosed in the present specification are merely illustrative in all respects. Accordingly, various improvements can be made as appropriate without departing from the gist of the present invention.

Summary of Above Embodiments

The following describes a summary of the article transport facility described above.

An article transport facility according to one aspect includes: a traveling rail disposed on a ceiling; a plurality of loading platforms provided on a ground side along the traveling rail; an article transport vehicle that is suspended from the traveling rail, travels along a traveling path formed by the traveling rail, and transports an article from a loading platform that is a transport source to a loading platform that is a transport destination; a first area in which the article is transported by the article transport vehicle; a second area that is provided in a region different from the first area, and in which adjustment of the article transport vehicle is performed; an adjustment device disposed in the second area; a first control device that controls operations of the article transport vehicle in the first area; and a second control device that controls operations of the article transport vehicle in the second area, wherein the traveling path includes a first path provided in the first area, and a second path that is provided in the second area and diverges from and merges with the first path, the article transport vehicle is provided with a communication control portion that can perform exclusive wireless communication with at least the first control device and the second control device, an operation control portion that causes the article transport vehicle to operate under autonomous control based on instructions from the first control device and the second control device, and a profile storage portion that stores transport profile information that includes at least position information for transferring the article at the loading platforms, the first control device gives the article transport vehicle an operation instruction for causing the article transport vehicle to operate, the operation instruction includes at least an article transport instruction for transporting the article, and a withdrawal instruction for causing the article transport vehicle to withdraw from the first area to the second area, the operation control portion of an adjustment target vehicle, which is the article transport vehicle that needs adjustment, causes the article transport vehicle to enter the second path based on the withdrawal instruction, and the communication control portion of the adjustment target vehicle changes a communication destination from the first control device to the second control device, in response to an adjustment instruction from the second control device, the operation control portion of the adjustment target vehicle performs adjustment with use of the adjustment device and updates the transport profile information, and the communication control portion of the adjustment target vehicle changes the communication destination from the second control device to the first control device after the transport profile information has been updated.

According to this configuration, the article transport facility region is divided into the first area in which articles are transported and the second area in which article transport vehicle adjustment is performed, and the first control device and the second control device that control the article transport vehicle are independently provided in the respective areas. Accordingly, article transport vehicle adjustment can be performed independently and efficiently, and without influencing article transport. Also, wireless communication is performed between the first control device and the article transport vehicle and between the second control device and the article transport vehicle, and therefore operations of the article transport vehicle can be controlled in the two areas without giving consideration to the connection of communication wiring or the like. Also, the article transport vehicle performs exclusive wireless communication with the first control device and the second control device, and therefore communication interference is suppressed without using multiple communication means or communication channels.

Also, after receiving the withdrawal instruction, the communication destination of the adjustment target vehicle is switched from the first control device to the second control device, and therefore article transport in the first area is never hindered. Note that the communication control portion may switch the communication destination based on only the withdrawal instruction, or may switch the communication destination after the operation control portion causes the adjustment target vehicle to enter the second path. In the latter case, an article transport vehicle that is no longer controlled by the first control device never remains in the first area. Accordingly, the hindrance of article transport in the first area is suppressed even more reliably. In the second area, the adjustment target vehicle performs adjustment operations in accordance with an adjustment instruction from the second control device, and updates the transport profile information. An operator is not involved in the adjustment operation, thus shortening the adjustment lead time and also reducing the need for operator effort. After adjustment is complete, the communication destination of the adjustment target vehicle is changed from the second control device to the first control device, and then the adjustment target vehicle is controlled by the first control device as a normal article transport vehicle, swiftly returns to the first area, and can transport articles. In this way, according to the above configuration, it is possible to efficiently perform article transport vehicle adjustment while also suppressing a decrease in the overall operation rate of the article transport facility.

In another aspect, it is preferable that the article transport facility further includes a facility supervising device that stores past operation statuses of each article transport vehicle as running information, the facility supervising device successively acquires operation status information that includes at least a transport count and a travel time for each article transport vehicle, selects the article transport vehicle that needs adjustment as the adjustment target vehicle based on the running information, and gives a result of the selection to the first control device, and the first control device gives the withdrawal instruction to the adjustment target vehicle based on the selection result.

Article transport vehicle adjustment can be carried out at the time of periodic inspection that is performed at a determined interval, for example. However, there are also cases where adjustment becomes necessary before periodic inspection, due to operation rate differences, individual differences, and the like between article transport vehicles. However, if the periodic inspection cycle is shortened, the operation rate of the article transport facility decreases. According to the above configuration, adjustment can be carried out on appropriate article transport vehicles at appropriate times.

In another aspect, it is preferable that the article transport vehicle is provided with a traveling portion that travels along the traveling path, a supporting portion that is supported to the traveling portion and suspends the article, and an elevation driving portion that raises and lowers the supporting portion relative to the traveling portion in a state where the traveling portion is stopped, in the second area, the supporting portion suspends the adjustment device instead of the article, and the adjustment device acquires adjustment data when being raised and lowered by the elevation driving portion, calculates transport profile information that corresponds to the adjustment target vehicle, and transmits the transport profile information to the adjustment target vehicle.

Similarly to a transport target article, the article transport vehicle uses the supporting portion to support the adjustment device, and uses the elevation driving portion to raise and lower the supporting portion that supports the adjustment device, thus making it possible to reproduce a state similar to that when actually transferring articles. The adjustment device can calculate precise transport profile information by acquiring adjustment data that conforms to actual operation.

Furthermore, it is preferable that the second area is provided with an adjustment loading platform that has an adjustment loading surface on which the adjustment device can be placed in the same manner as a manner in which the article is placed on the loading platforms, and in the second area, the adjustment device is placed on at least two adjustment loading surfaces that have different heights, and the adjustment device acquires the adjustment data when being raised and lowered from and to the at least two adjustment loading surfaces.

Besides the stop position of the article transport vehicle on the traveling path, there are also cases where error arises in the position of the supporting portion in the up-down direction due to change over time and individual differences between article transport vehicles. It is not always the case that the ground height of the loading platform on which the article is placed is constant. Due to the adjustment device being placed on adjustment loading surfaces that have different heights, the adjustment device can acquire adjustment data when the supporting portion is raised from and lowered to various heights. Accordingly, it is possible to perform even more appropriate adjustment that is suited to actual operation.

Also, it is preferable that at least two adjustment loading platforms that have adjustment loading surfaces with different heights are arranged along the second path, and the adjustment target vehicle transfers the adjustment device between different adjustment loading platforms while traveling along the second path, and the adjustment device acquires the adjustment data for each of the adjustment loading platforms.

According to this configuration, the operations for transferring the adjustment device instead of the article are performed successively while moving along the traveling path, thus making it possible for the adjustment device to efficiently acquire adjustment data while performing transfer under various conditions and while satisfying transport conditions. In other words, according to this configuration, adjustment corresponding to various conditions can be carried out efficiently.

Furthermore, it is preferable that the adjustment loading platforms are arranged along the second path in order of descending or ascending ground height.

In general, when transfer of the adjustment device with respect to one adjustment loading platform is complete, the supporting portion that is raised and lowered by the elevation driving portion generally returns to a reference position. However, it is also possible to continue on to a different adjustment loading platform without returning the supporting portion to the reference position. In such a case, if the adjustment loading platforms are aligned in order of ground height, it is possible to reduce the amount of movement of the supporting portion in the up-down direction by the elevation driving portion, and it is possible to shorten the adjustment time. In other words, according to this configuration, it is possible for the adjustment device to even more efficiently acquire adjustment data while performing transfer under various conditions and while satisfying transport conditions.

Also, it is preferable that ground heights of the adjustment loading surfaces are heights that correspond to ground heights of the loading platforms.

If the ground heights of the adjustment loading surface correspond to the ground heights of the loading platforms on which articles are actually placed, it is possible to perform adjustment in aspects that correspond to actual use aspects. As a result, it is possible to perform appropriate adjustment that is suited to actual operation.

What is claimed is:

1. An article transport facility comprising:
a traveling rail disposed on a ceiling;
a plurality of loading platforms provided on a ground side along the traveling rail;
an article transport vehicle that is suspended from the traveling rail, travels along a traveling path formed by the traveling rail, and transports an article from a loading platform that is a transport source to a loading platform that is a transport destination;
a first area in which the article is transported by the article transport vehicle;
a second area that is provided in a region different from the first area, and in which adjustment of the article transport vehicle is performed;
an adjustment device disposed in the second area;
a first control device that controls operations of the article transport vehicle in the first area; and
a second control device that controls operations of the article transport vehicle in the second area,
wherein:
the traveling path includes a first path provided in the first area, and a second path that is provided in the second area and diverges from and merges with the first path,
the article transport vehicle is provided with a communication control portion that can perform exclusive wireless communication with at least the first control device and the second control device, an operation control portion that causes the article transport vehicle to operate under autonomous control based on instructions from the first control device and the second control device, and a profile storage portion that stores transport profile information that includes at least position information for transferring the article at the loading platforms,
the first control device gives the article transport vehicle an operation instruction for causing the article transport vehicle to operate,
the operation instruction includes at least an article transport instruction for transporting the article, and a withdrawal instruction for causing the article transport vehicle to withdraw from the first area to the second area,
the operation control portion of an adjustment target vehicle, which is the article transport vehicle that needs adjustment, causes the article transport vehicle to enter the second path based on the withdrawal instruction, and the communication control portion of the adjustment target vehicle changes a communication destination from the first control device to the second control device,
in response to an adjustment instruction from the second control device, the operation control portion of the adjustment target vehicle performs adjustment with use of the adjustment device and updates the transport profile information, and
the communication control portion of the adjustment target vehicle changes the communication destination from the second control device to the first control device after the transport profile information has been updated.

2. The article transport facility according to claim 1, further comprising a facility supervising device that stores past operation statuses of each article transport vehicle as running information,
wherein the facility supervising device successively acquires operation status information that includes at least a transport count and a travel time for each article transport vehicle, selects the article transport vehicle that needs adjustment as the adjustment target vehicle based on the running information, and gives a result of the selection to the first control device, and
wherein the first control device gives the withdrawal instruction to the adjustment target vehicle based on the selection result.

3. The article transport facility according to claim 1,
wherein the article transport vehicle is provided with a traveling portion that travels along the traveling path, a supporting portion that is supported to the traveling portion and suspends the article, and an elevation driving portion that raises and lowers the supporting portion relative to the traveling portion in a state where the traveling portion is stopped,
wherein in the second area, the supporting portion suspends the adjustment device instead of the article, and
wherein the adjustment device acquires adjustment data when being raised and lowered by the elevation driving portion, calculates transport profile information that corresponds to the adjustment target vehicle, and transmits the transport profile information to the adjustment target vehicle.

4. The article transport facility according to claim 3,
wherein the second area is provided with an adjustment loading platform that has an adjustment loading surface on which the adjustment device can be placed in the same manner as a manner in which the article is placed on the loading platforms, and
wherein in the second area, the adjustment device is placed on at least two adjustment loading surfaces that have different heights, and the adjustment device acquires the adjustment data when being raised and lowered from and to the at least two adjustment loading surfaces.

5. The article transport facility according to claim 4,
wherein at least two adjustment loading platforms that have adjustment loading surfaces with different heights are arranged along the second path, and the adjustment target vehicle transfers the adjustment device between different adjustment loading platforms while traveling along the second path, and wherein the adjustment device acquires the adjustment data for each of the adjustment loading platforms.

6. The article transport facility according to claim 5, wherein the adjustment loading platforms are arranged along the second path in order of descending or ascending ground height.

7. The article transport facility according to claim 4, wherein ground heights of the adjustment loading surfaces are heights that correspond to ground heights of the loading platforms.

* * * * *